(12) United States Patent
Shibata et al.

(10) Patent No.: US 8,908,988 B2
(45) Date of Patent: Dec. 9, 2014

(54) METHOD AND SYSTEM FOR RECOVERING A CODE IMAGE INCLUDING BLURRING

(75) Inventors: Takashi Shibata, Tokyo (JP); Akihiko Iketani, Tokyo (JP); Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 78 days.

(21) Appl. No.: 13/812,080

(22) PCT Filed: Aug. 11, 2011

(86) PCT No.: PCT/JP2011/004555
§ 371 (c)(1),
(2), (4) Date: Jan. 24, 2013

(87) PCT Pub. No.: WO2012/029238
PCT Pub. Date: Mar. 8, 2012

(65) Prior Publication Data
US 2013/0195373 A1 Aug. 1, 2013

(30) Foreign Application Priority Data
Aug. 31, 2010 (JP) ................................ 2010-193745

(51) Int. Cl.
G06K 9/40 (2006.01)
G06T 5/00 (2006.01)
G06K 7/14 (2006.01)

(52) U.S. Cl.
CPC .............. G06T 5/003 (2013.01); G06K 7/1473 (2013.01)
USPC .......................................... 382/263; 382/266

(58) Field of Classification Search
None
See application file for complete search history.

(56) References Cited

U.S. PATENT DOCUMENTS 6,758,399 B1 * 7/2004 Brunelli et al. ........... 235/462.01
7,143,948 B2 * 12/2006 Nakazawa et al. ......... 235/462.1
(Continued)

FOREIGN PATENT DOCUMENTS

JP 2005-322061 A 11/2005
JP 2009-32105 A 2/2009
(Continued)

OTHER PUBLICATIONS

Liu, Yue, Ju Yang, and Mingjun Liu. "Recognition of QR code with mobile phones." Control and Decision Conference, 2008. CCDC 2008. Chinese. IEEE, 2008.*

(Continued)

*Primary Examiner* — Li Liu
(74) *Attorney, Agent, or Firm* — Sughrue Mion, PLLC

(57) ABSTRACT

Error-function determining means makes use of a blur function serving as a function representing the degree of blurring of a blurred input image and a geometrical-deformation matrix serving as a matrix for restricting an operation to lay out a 2-dimensional code shown by the input image on cells each serving as a configuration unit of the 2-dimensional code in order to determine an error function serving as a function satisfying a relation that, the smaller the error between the input image and an image obtained by adding geometrical deformations and blurs to a recovered image obtained from a recovering process, the more the approach to a result determined in advance. Pixel-value restricting means determines pixel-value restriction information prescribing a restriction condition for a restriction imposed on a predetermined pixel value obtained from discretization of pixel values of the 2-dimensional code to be recovered. Objective-function determining means makes use of the error function and the pixel-value restriction information as a basis for determining an objective function serving as a function satisfying a relation that, the closer the recovered image to the true image, the more the approach to a result determined in advance. Objective-function optimizing means determines a recovered image optimizing the objective function.

10 Claims, 12 Drawing Sheets

(56) References Cited

U.S. PATENT DOCUMENTS

| | | | |
|---|---|---|---|
| 7,175,088 B2* | 2/2007 | Kim et al. | 235/460 |
| 7,546,950 B2* | 6/2009 | Thiyagarajah | 235/462.09 |
| 8,270,749 B2* | 9/2012 | Nadabar et al. | 382/254 |
| 8,322,620 B2* | 12/2012 | Ye et al. | 235/462.09 |
| 2010/0020970 A1* | 1/2010 | Liu et al. | 380/255 |
| 2010/0230493 A1* | 9/2010 | Akiyama | 235/437 |

FOREIGN PATENT DOCUMENTS

| | | |
|---|---|---|
| JP | 2009-182735 A | 8/2009 |
| JP | 2009-223630 A | 10/2009 |

OTHER PUBLICATIONS

Ohbuchi, Eisaku, Hiroshi Hanaizumi, and Lim Ah Hock. "Barcode readers using the camera device in mobile phones." Cyberworlds, 2004 International Conference on. IEEE, 2004.*

Liu, Yue, Bo Yang, and Ju Yang. "Bar code recognition in complex scenes by camera phones." Natural Computation, 2008. ICNC'08. Fourth International Conference on. vol. 5. IEEE, 2008.*

Bruce D. Lucas et al., "An Iterative Image Registration Technique with an Application to Stereo Vision", Proceedings of Imaging Understanding Workshop, 1981, pp. 121-130.

International Search Report for PCT/JP2011/004555 dated Sep. 6, 2011.

* cited by examiner

METHOD AND SYSTEM FOR RECOVERING A CODE IMAGE INCLUDING BLURRING

CROSS REFERENCE TO RELATED APPLICATIONS

This application is a National Stage of International Application No. PCT/JP2011/004555 filed Aug. 11, 2011, claiming priority based on Japanese Patent Application No. 2010-193745 filed Aug. 31, 2010, the contents of all of which are incorporated herein by reference in their entirety.

TECHNICAL FIELD

The present invention relates to an image processing system for recovering an unclear image, an image processing method and an image processing program. More particularly, the present invention relates to an image processing system capable of precisely recovering an area in an image including 2-dimensional codes, an image processing method and an image processing program.

BACKGROUND ART

In order to recognize 2-dimensional codes, which have been obtained as a result of photographing, by making use of a special code reader, the edges of the image obtained as a result of the photographing must be clear and blurring must be sufficiently little. Due to restrictions imposed on the imaging system and due to the photographing environments, however, it is difficult to obtain an image with little blurring. In order to solve this problem, it is necessary to obtain an image with, whose blurring has been removed by carrying out image processing, as a recovered image.

For example, Patent Document 1 describes an image recovering method for eliminating blurring by adoption of a general image recovering technology for a 2-dimensional code area in an image. The image recovering method described in Patent Document 1 is carried out by execution of filtering on image data in order to provide a recovered image. In this case, the filtering is executed by making use of a blur eliminating filter for an image and an averaging filter of an edge holding type and an average type.

In addition, Patent Document 2 describes an image processing apparatus for eliminating blurring under a condition requiring that the image be a binary image. The image processing apparatus described in Patent Document 2 finds a correction quantity in order to provide an inferred image on the basis of the correction quantity. In this case, the correction quantity is found by integrating a correction quantity for binary conversion and a correction quantity for image deteriorations.

It is to be noted that, in the following description, the smallest unit of 2-dimensional codes is referred to as a cell. The case of a QR code (a registered trademark) is explained as an example by referring to FIG. 13. FIG. 13 is an explanatory diagram showing a QR code. White square points F131 composing the QR code shown in FIG. 13 are each a cell. In addition, a pattern used for detecting the position and size of the 2-dimensional code is referred to as a marker. In the QR code shown in FIG. 13, 3 corner square cut-out symbols are each a marker. The cut-out symbols are denoted by reference notations F132, F133 and F134. In addition, in the following description, an image of photographed 2-dimensional codes is referred to as a code image. Furthermore, an image with unclear edges is also referred to as a blurring image. Moreover, a 2-dimensional code is also referred to simply as a code in some cases.

CITATION LIST

Patent Literature

Patent Document 1
JP-A-2009-32105
Patent Document 2
JP-A-2009-223630

SUMMARY OF INVENTION

Technical Problem

In general, blur elimination processing is a defect setting problem. That is to say, for an image with an unclear edge, a recovered image serving as a solution is not determined uniquely. In addition, the more the blurring, the more difficult the determination of a unique solution so that the recovered image becomes unstable easily. In order to solve the defect setting problem, it is necessary to impose some restrictions on a solution (that is, the recovered image) so that an accurate recovered image becomes the solution. In accordance with the method described in Patent Document 1, however, recovering is merely carried out by filtering and no restrictions are imposed on the recovered image so that there is raised a problem that it may be difficult to obtain an accurate recovered image.

In accordance with the method described in Patent Document 2, a characteristic that the image is a binary image is used. This characteristic is one of a plurality of characteristics related to a 2-dimensional code. Thus, it is possible to impose a restriction on the recovered image, that is, the solution. It is desirable, however, that by imposing a stronger restriction on the recovered image, the instability of the solution can be suppressed and an accurate recovered image can be obtained even if the blurring is much.

It is thus an exemplary object of the present invention to provide an image processing system capable of obtaining an accurate recovered image from a code image with much blurring, provide an image processing method for the system and provide an image processing program of the method.

Solution to Problem

An image processing system according to the present invention is characterized by comprising:
error-function determining means for making use of a blur function serving as a function representing the degree of blurring of a blurred input image and a geometrical-deformation matrix serving as a matrix for restricting an operation to lay out a 2-dimensional code shown by the input image on cells each serving as a configuration unit of the 2-dimensional code in order to determine an error function serving as a function satisfying a relation that, the smaller the error between the input image and an image obtained by adding geometrical deformations and blurs to a recovered image obtained from a recovering process, the more the approach to a result determined in advance;
pixel-value restricting means for determining pixel-value restriction information prescribing a restriction condition for a restriction imposed on a predetermined pixel value obtained from discretization of pixel values of the 2-dimensional code to be recovered;

objective-function determining means for making use of the error function and the pixel-value restriction information as a basis for determining an objective function serving as a function satisfying a relation that, the closer the recovered image to the true image, the more the approach to a result determined in advance; and objective-function optimizing means for determining a recovered image which optimizes the objective function.

An image processing method according to the present invention is characterized in that the method is carried out by:

determining an error function by making use of a blur function serving as a function representing the degree of blurring of a blurred input image and a geometrical-deformation matrix serving as a matrix for restricting an operation to lay out a 2-dimensional code shown by the input image on cells each serving as a configuration unit of the 2-dimensional code wherein the error function is a function satisfying a relation that, the smaller the error between the input image and an image obtained by adding geometrical deformations and blurs to a recovered image obtained from a recovering process, the more the approach to a result determined in advance;

determining pixel-value restriction information prescribing a restriction condition for a restriction imposed on a predetermined pixel value obtained from discretization of pixel values of the 2-dimensional code to be recovered;

determining an objective function on the basis of the error function and the pixel-value restriction information wherein the objective function is a function satisfying a relation that, the closer the recovered image to the true image, the more the approach to a result determined in advance; and determining a recovered image which optimizes the objective function.

An image processing program according to the present invention is characterized in that the program is executed by a computer to carry out:

error-function determination processing to make use of a blur function serving as a function representing the degree of blurring of a blurred input image and a geometrical-deformation matrix serving as a matrix for restricting an operation to lay out a 2-dimensional code shown by the input image on cells each serving as a configuration unit of the 2-dimensional code in order to determine an error function serving as a function satisfying a relation that, the smaller the error between the input image and an image obtained by adding geometrical deformations and blurs to a recovered image obtained from a recovering process, the more the approach to a result determined in advance;

pixel-value restriction processing to determine pixel-value restriction information prescribing a restriction condition for a restriction imposed on a predetermined pixel value obtained from discretization of pixel values of the 2-dimensional code to be recovered;

objective-function determination processing to make use of the error function and the pixel-value restriction information as a basis for determining an objective function serving as a function satisfying a relation that, the closer the recovered image to the true image, the more the approach to a result determined in advance; and objective-function optimization processing to determine a recovered image which optimizes the objective function.

Advantageous Effects of Invention

In accordance with the present invention, an accurate recovered image can be obtained from a much blurring code image.

DESCRIPTION OF EMBODIMENTS

Exemplary embodiments of the present invention are explained by referring to the diagrams as follows.

First Exemplary Embodiment

Figure 1:
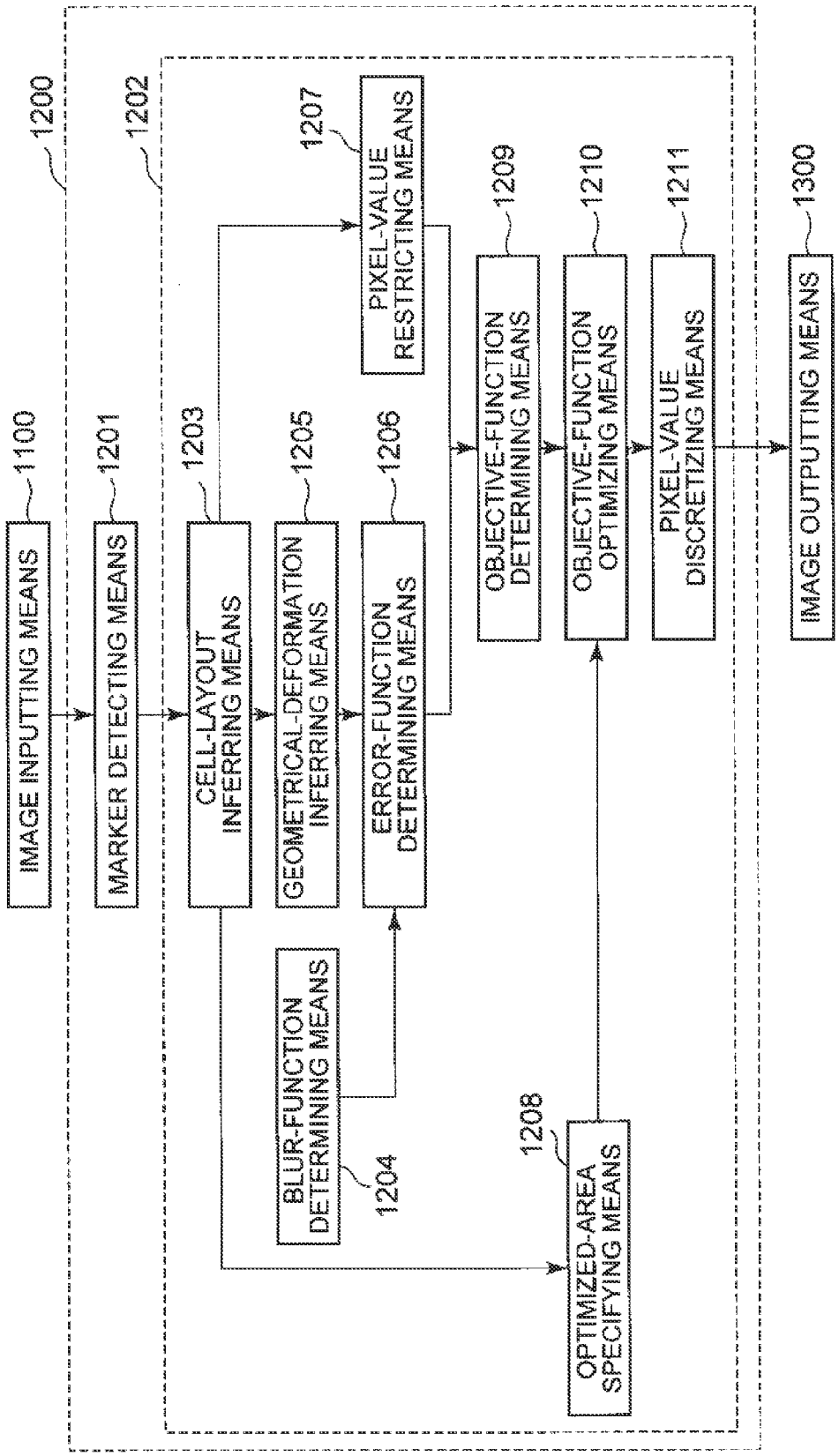
FIG. 1 It depicts a block diagram showing an example of an image processing system according to a first exemplary embodiment of the present invention.

FIG. 1 is a block diagram showing an example of an image processing system according to a first exemplary embodiment of the present invention. The image processing system according to the first exemplary embodiment includes image inputting means 1100, a computer 1200 operating in accordance with control carried out by execution of programs and image outputting means 1300. It is to be noted that the computer 1200 is also referred to as a central processing apparatus, a processor or a data processing apparatus.

The computer 1200 includes marker detecting means 1201 and marker-area blur removing means 1202. In addition, the marker-area blur removing means 1202 has cell-layout inferring means 1203, blur-function determining means 1204, geometrical-deformation inferring means 1205, error-function determining means 1206, pixel-value restricting means 1207, optimized-area specifying means 1208, objective-function determining means 1209, objective-function optimizing means 1210 and pixel-value discretizing means 1211.

The image inputting means 1100 inputs an image obtained by a camera, a scanner or the like. Then, the image inputting means 1100 stores the input image in a memory (not shown in the figure) or the like. In this case, the luminance values of pixels in an image input by the image inputting means 1100 are expressed by Y which represents a vertical vector laid in the raster scan order. If the number of pixels in the input image is N for example, Y represents a vertical vector as follows: $Y=(Y_1, \ldots, Y_i, \ldots, Y_N)^t$. It is to be noted that the raised suffix $^t$ means a transposed matrix. The following description explains a case in which processing is carried out by making use of luminance values of the input image. It is also to be kept in mind, however, that information showing the input image is by no means limited to the luminance values. That is to say, the following description explains a case in which, in accordance with this exemplary embodiment, the image inputting means 1100 stores luminance values. However, values supplied to the image inputting means 1100 are by no means limited to luminance values. For example, if the input image is represented by RGB signals and the RGB luminance values are independently represented by respectively vertical vectors $Y_R$, $Y_G$ and $Y_B$ each laid in the scan raster order, the image inputting means 1100 may store $Y_R$, $Y_G$ and $Y_B$ in the memory.

In addition, the following description explains a case in which, in accordance with this exemplary embodiment, the number of images supplied to the image inputting means 1100 and stored in the memory (not shown in the figure) is 1. However, the number of images supplied to the image inputting means 1100 is by no means limited to 1. The number of images supplied to the image inputting means 1100 can be P. (That is to say, P images can be supplied to the image inputting means 1100.) If a plurality of images the number of which is P are supplied to the image inputting means 1100, vertical vectors Y1, Y2, . . . and YP each laid in the raster scan order may be stored in the memory (not shown in the figure) as vectors representing the luminance values of pixels in the P input images.

The marker detecting means 1201 detects a marker characterizing a code from an image supplied to the image inputting means 1100. That is to say, this marker can also be referred to as a pattern determined for every type of the 2-dimensional code. The marker detecting means 1201 may adopt a template matching method or the like as a method for detecting a marker. In addition, the marker detecting means 1201 stores the input image and the detected marker in a memory (not shown in the figure) or the like. It is to be noted that, if a plurality of images have been received, the marker detecting means 1201 detects markers for all the images and stores the input images and the detected markers in the memory (not shown in the figure) or the like.

Figure 2:
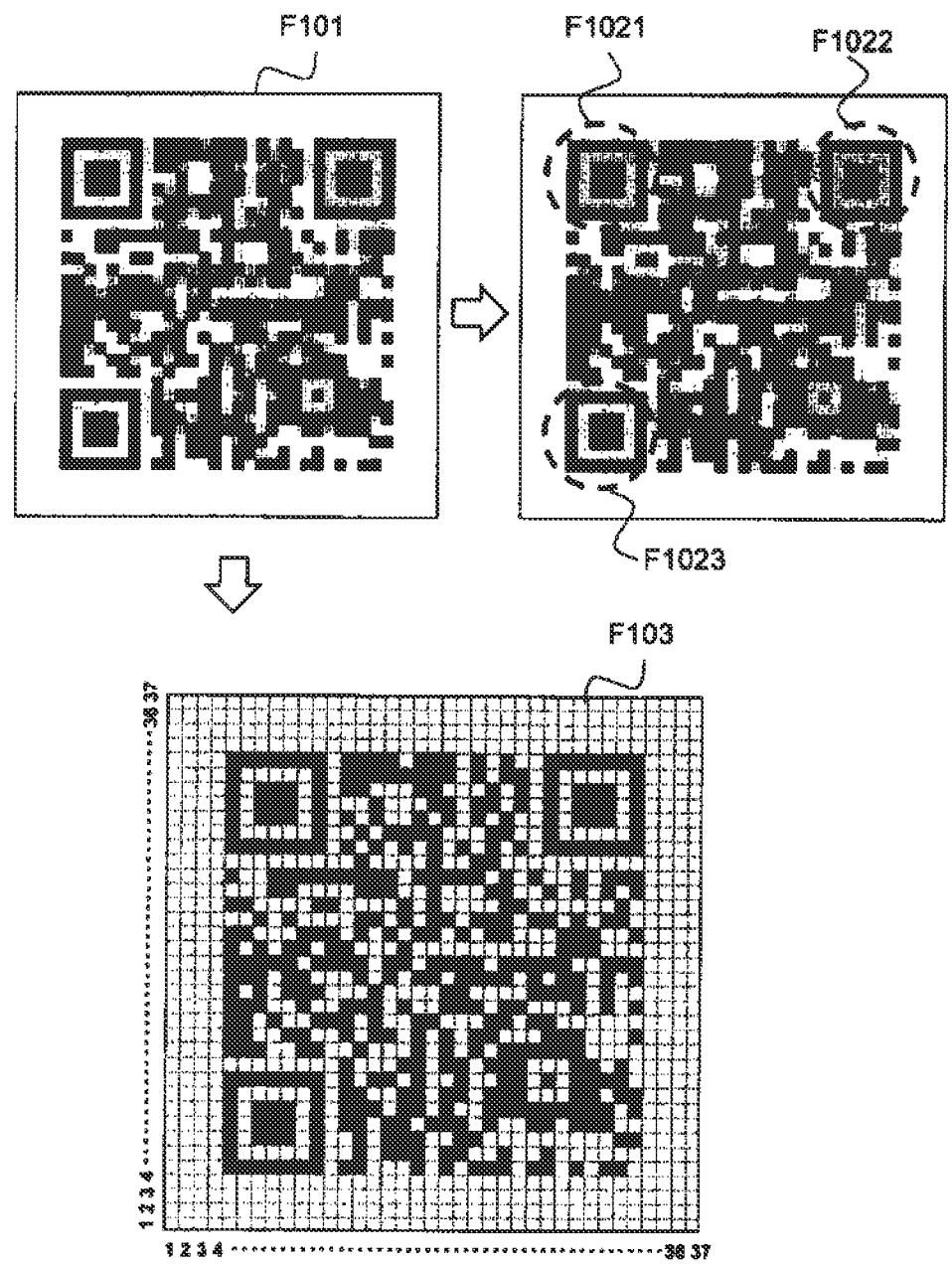
FIG. 2 It depicts an explanatory diagram showing an example of a relation between an image and cells in a QR code.

If the code is a QR code, a marker is detected from the QR code by adoption of a method explained in concrete terms by referring to FIG. 2 as follows. FIG. 2 is an explanatory diagram showing an example of a relation between an image and cells in a QR code. An image F101 shown in FIG. 2 is an input image. In this case, the marker detecting means 1201 detects markers F1021, F1022 and F1023.

When the marker detecting means 1201 detects a marker characterizing a code, the marker-area blur removing means 1202 generates a code image (that is, a recovered image) with blurs eliminated from an area identified by the marker. For example, let the number of pixels in the recovered image be equal to the number of cells in the code. In addition, let X denote a vertical vector laid in the raster scan order to serve as a vector representing the luminance values of the pixels in the recovered image. The vertical vector X may be described as a recovered image in some cases. If the number of pixels in the input image is M, the vertical vectors X is expressed as follows: $X=(X_1, \ldots, X_i, \ldots, X_M)^t$. If the image F101 shown in FIG. 2 has been supplied for example, the number of pixels in the recovered image is a cell count shown as an example in F103. As shown in the figure, the cell count representing the number of cells is 37×37. Thus, in this case, the number of dimensions of the vertical vector X is 1,369 (=37×37). The description given so far has explained a case in which a recovered image is generated by making use of only luminance values. It is to be noted, however, that the method adopted by the marker-area blur removing means 1202 to generate an image is by no means limited to the method making use of luminance values. For example, if the RGB values of pixels are independently represented by respectively vertical vectors $X_B$, $X_G$ and $X_B$ each laid in the scan raster order, the marker-area blur removing means 1202 may generate recovered images represented by their respective RGB values.

The image outputting means 1300 is an output apparatus for outputting a recovered image X generated by the marker-area blur removing means 1202. For example, the image outputting means 1300 is implemented by a display apparatus or the like.

Configuration elements included in the marker-area blur removing means 1202 are explained as follows. The cell-layout inferring means 1203 infers a cell layout from a marker detected by the marker detecting means 1201. It is to be noted that the cell layout is represented by parameters prescribing the positions of configuration elements of the code. An example of the parameters is the number of cells in the code. It is to be kept in mind that the layout inferred by the cell-layout inferring means 1203 does not have to be the layout of cells. That is to say, the layout inferred by the cell-layout inferring means 1203 can also be a layout of configuration elements other than cells. Such configuration elements are prescribed for every type of the 2-dimensional code.

To put it concretely, the cell-layout inferring means 1203 identifies the type of the 2-dimensional code on the basis of the marker detected by the marker detecting means 1201. Then, on the basis of a format determined for every type of the 2-dimensional code, the cell-layout inferring means 1203 infers the number of cells in the entire code. It is to be noted that a relation between the marker and the 2-dimensional code as well as a relation between the 2-dimensional code and the format have been stored in a memory or the like in advance. Then, let the cell-layout inferring means 1203 identify the type of the 2-dimensional code and infer the number of cells on the basis of these relations.

Subsequently, the cell-layout inferring means 1203 stores the inferred cell layout as well as the marker and the input image, which have been stored before in the marker detecting means 1201, in a memory (not shown in the figure) or the like. It is to be noted that, if a plurality of input images have been received, the cell-layout inferring means 1203 may infer the cell layouts for all the images and store the inferred cell layouts as well as the markers stored before by the marker detecting means 1201 in a memory (not shown in the figure) or the like.

The blur-function determining means 1204 determines a function representing the degree of blurring of a detected code image (that is, an image with a photographed 2-dimensional code). In the following description, this function is referred to as a blur function. In general, when photographing an image, the image blurs due to, among others, the fact that the photographic object does not coincide with the focal point of a lens employed in the optical system or hand trembling. Thus, edges in the image also become blurred. The blur function is a function for representing the effect of edges becoming blurred in the image.

An example of the blur function is a PSF (Point Spread Function). However, the PSF is not the only blur function. The blur function can be any function other than the PSF as long as the other function represents the degree of blurring of a blurring image. The blur-function determining means 1204 stores the blur function determined thereby in a memory (not shown in the figure) or the like. It is to be noted that, if a plurality of input images have been received, the blur-function determining means 1204 determines a blur function for each of the input images and stores the blur functions determined thereby in a memory (not shown in the figure) or the like.

The blur-function determining means 1204 may determine a blur function by detecting the degree of blurring of the code image from the input image. The blur-function determining means 1204 may also determine a blur function by inferring the movement of the photographing apparatus on the basis of typically information showing an imaging surface gradient detected by an angular-velocity sensor such as a gyro sensor and/or information showing parallel movement components detected by an acceleration sensor. In addition, a function specified by the user in advance can also be used as a blur function. If the user specifies a blur function, the blur-function determining means 1204 may determine the blur function specified by the user.

In the following description, a blur represented by a blur function is expressed by an N×N matrix B. A vector Z is a vertical vector laid in the raster scan order to serve as a vector representing a pixel value of each of pixels in an image having a pixel count N. On the other hand, a vector $Z_b$ is a vertical vector laid in the raster scan order to serve as a vector representing a pixel value of each of pixels in an image Z graded by the given blur function. In this case, a relation between the vertical vector Z and the vertical vector $Z_b$ is expressed by Eq. 1 based on the matrix B as follows:

$$Z_b = B \cdot Z \qquad \text{(Eq. 1)}$$

In other words, the vertical vector Z represents an unblurred image whereas the vertical vector $Z_b$ represents a blurred image. Since the input image is a blurred image, the input image corresponds to the vertical vector $Z_b$.

From the cell layout inferred by the cell-layout inferring means 1203 and the input image, the geometrical-deformation inferring means 1205 infers their geometrical-deformation matrix W. The geometrical-deformation matrix W is a matrix for restricting the layout of a 2-dimensional code on cells. In other words, the geometrical-deformation matrix W can also be said to be a matrix allocating luminance values of input pixels to cells composing the code.

Here, input-image changes taking the code shape (that is, the cell layout) as a reference are represented by a geometrical-deformation model in which parallel movements, rotations, enlargements and the like are uniform. In addition, the changes of the input image are also represented by a geometrical-deformation model which is a non-uniform deformation expressed by an interpolating function such as a B spline function. On top of that, these conversion models are represented by parameters such as a parallel-movement quantity and a rotation quantity. For example, if the geometrical-conversion model has been determined in advance, the geometrical-deformation inferring means 1205 infers parameters of the conversion model and computes a geometrical-deformation matrix W by making use of the inferred parameters.

It is to be noted that the parameters of a conversion model can be said to be parameters used in conversion processing carried out in order to make a characteristic point (for example, the coordinates of the center of a marker) existing in code shape serving as a reference coincide with the corresponding characteristic point (for example, the coordinates of the center of a marker) of the input image. Thus, the geometrical-deformation inferring means 1205 finds these parameters by adoption of typically the least square method and makes use of these parameters as the parameters of the conversion model.

The above description has explained a method adopted by the geometrical-deformation inferring means 1205 to find the parameters of the conversion model by making use of a characteristic point. It is to be noted, however, that the method adopted by the geometrical-deformation inferring means 1205 to find the parameters of the conversion model is by no means limited to the method making use of a characteristic point. In place of the method based on a characteristic point, for example, the geometrical-deformation inferring means 1205 may also find the parameters of the conversion model by adoption of a technique based on an area as is described in the following reference document.

Reference Document

Bruce D. Lucas and Takeo Kanade, "An Iterative Registration Technique with an Application to Stereo Vision", Proceedings of Imaging Understanding Workshop, 1981, pp. 121-130

If this conversion model and the parameters are computed, it is possible to find a relation between the position of the input image and the position of the code. Thus, the geometrical-deformation inferring means 1205 interpolates the pixel value of a position at which the code exists from typically the luminance values of locations surrounding the position corresponding to the input image in order to find the pixel value. (That is to say, the geometrical-deformation inferring means 1205 finds the pixel value by finding a linear sum of the pixel values of the input image).

Here, let reference notation N denote a pixel count representing the number of pixels in the input image whereas reference notation M denote a pixel count representing the number of pixels in the post-conversion input image. In this case, the geometrical-deformation matrix W can be represented as an N×M matrix. To put it concretely, let reference notation $Z_N$ denote a vertical vector having components which are pixel values of a specific image with the pixel count N whereas reference notation $Z_M$ denote a vertical vector having components which are pixel values of this specific image deformed by the geometrical-deformation matrix W into an image with the pixel count M. In this case, the relation between the vertical vector $Z_N$ and the vertical vector $Z_M$ is expressed by Eq. 2 based on the geometrical-deformation matrix W as follows:

$$Z_M = W \cdot Z_N \qquad \text{(Eq. 2)}$$

That is to say, the vertical vector $Z_M$ represents the image before the geometrical deformation whereas the vertical vector $Z_N$ represents the image after the geometrical deformation. The cell layout is geometrically deformed and, in addition, a blurring image is the input image. Thus, the input image Y corresponds to the vertical vector $Z_N$.

Then, the geometrical-deformation inferring means 1205 stores the geometrical-deformation matrix W inferred thereby, the cell layout and the input image in a memory (not shown in the figure) or the like. It is to be noted that, if a plurality of input images are supplied, the geometrical-deformation inferring means 1205 infers a geometrical-deformation matrix for each of the input images, storing the geometrical-deformation matrixes inferred thereby, the cell layouts and the input images in a memory (not shown in the figure) or the like.

The error-function determining means 1206 determines an error function $E_{data}$ (X), which represents a relation between the luminance component Y of the input image and the luminance component X of the recovered image, by making use of the input image, the blur matrix B determined by the blur-function determining means 1204 and the geometrical-deformation matrix W inferred by the geometrical-deformation inferring means 1205. Then, the error-function determining means 1206 stores the error function $E_{data}$ (X) determined thereby in a memory (not shown in the figure) or the like. The error function $E_{data}$ (X) is a function including the luminance component Y, the luminance component X, the geometrical-deformation matrix W and the blur matrix B. The error function $E_{data}$ (X) has such a value varying in such a way that, the more correct the recovered image shown by the luminance component X, the smaller the value of the error function $E_{data}$ (X). (That is to say, the smaller the error between the input image and an image obtained as a result of addition of geometrical deformation and blurs to the recovered image, the smaller the value of the error function $E_{data}$ (X).) The error function $E_{data}$ (X) is defined in advance as a relation equation expressed by typically Eq. 3 shown as follows:

$$E_{data}(X)=f(|B \cdot W \cdot X-Y|) \quad \text{(Eq. 3)}$$

In this case, notation f (·) is a function having a value varying in such a way that, the smaller the value of the argument ·, the smaller the value of the function. In addition, notation |·| represents a vector norm. It is to be noted that determination of a function can be said to be application of parameters such as the blur matrix B and the geometrical-deformation matrix W to a relation equation determined in advance. So, the error-function determining means 1206 stores the parameters required for representing the error function $E_{data}$ (X) in a memory. The parameters are the input image, the blur matrix B and the geometrical-deformation matrix W.

The above description explains a case in which the error-function determining means 1206 determines an error function making use of the luminance value only. It is to be noted, however, that values used in the error function determined by the error-function determining means 1206 are by no means limited to the luminance value. If the recovered image is represented by making use of RGB values (that is, $X_R, X_G$ and $X_B$) for example, an error function $E_{data}(X_R, X_G, X_B)$ can be defined as a relation equation like one expressed by Eq. 4 given as follows.

$$E_{data}(X_R,X_G,X_B)=f(|B \cdot W \cdot X_R-Y_R|)+f(|B \cdot W \cdot X_G-Y_G|)+f(|B \cdot W \cdot X_B-Y_B|) \quad \text{(Eq. 4)}$$

The above description explains a case in which the error-function determining means 1206 determines an error function by making use of only 1 input image. It is to be noted, however, that the number of input images used by the error-function determining means 1206 to determine an error function is by no means limited to 1. For example, the number of input images used by the error-function determining means 1206 to determine an error function is P. In this case, an error function $E_{data}$ (X) can be defined as a relation equation like one expressed by Eq. 5 given below. In the equation, symbols Y1, Y2, . . . and YP denote the luminance values of the P input images respectively.

$$E_{data}(X)=f(|B1 \cdot W1 \cdot X-Y1|)+f(|B2 \cdot W2 \cdot X-Y2|)+ \ldots +f(|BP \cdot WP \cdot X-YP|) \quad \text{(Eq. 5)}$$

In the above equation, symbols B1, B2, . . . and BP each denote a blur matrix inferred for one of the input images whereas symbols W1, W2, . . . and WP each denote a geometrical-deformation matrix inferred for one of the input images.

The pixel-value restricting means 1207 determines information prescribing a restriction condition for imposing a restriction on a pixel value obtained as a result of discretization of a pixel value which a recovered image can take. In the following description, such information is referred to as pixel-value restriction information. As the pixel-value restriction information, for example, the pixel-value restricting means 1207 may determine restriction condition requiring that a pixel value which a recovered image can take be a small number of discretized values. However, the pixel-value restriction information determined by the pixel-value restricting means 1207 is by no means limited to such a restriction condition. That is to say, the pixel-value restricting means 1207 may also determine other pixel-value restriction information. For example, as the pixel-value restriction information, the pixel-value restricting means 1207 may define a function showing that, the closer the pixel values of pixels included in the image to one of discretized pixel values, the more appropriate the image and may determine this function as a restriction condition.

The following description explains a case in which, as the pixel-value restriction information, the pixel-value restricting means 1207 defines a function showing that, the closer the pixel values of pixels included in the image to one of discretized pixel values, the more appropriate the image and determines this function as a restriction condition.

The pixel-value restricting means 1207 defines a pixel-value restricting function $E_{reg}$ (X) restricting an operation to configure the code from a small number of discretized values and stores the pixel-value restricting function defined thereby in a memory (not shown in the figure) or the like. In the following description, an operation carried out by the pixel-value restricting means 1207 to define a pixel-value restricting function is referred to as an operation carried out by the pixel-value restricting means 1207 to determine a pixel-value restricting function in some cases. The pixel-value restricting function $E_{reg}$ (X) is defined as a function having a value which varies in such a way that, the closer the pixel values of pixels included in a comparison image to one of a small number of discretized pixel values determined as pixel values composing a 2-dimensional code, the smaller the value of the function. For example, if the code is configured from i pixel values, the pixel-value restricting function $E_{reg}$ (X) is defined in advance as a relation equation like one expressed by Eq. 6 given as follows:

$$E_{reg}(X)=g(X,X_1, \ldots ,X_i) \quad \text{(Eq. 6)}$$

In the above equation, symbols $X_1$ to $X_i$ denote pixel values composing the code. In addition, the function g ($X, X_1, \ldots, X_i$) is a function having a value which varies in such a way that, the closer the components of the vertical vector X to one of the pixel values $X_1$ to $X_i$, the smaller the value of the function. The following description explains an example in which the code is a QR code. Since the QR code is configured from 2 pixel values for the white and black colors respectively, the pixel-value restricting function $E_{reg}$ (X) can be defined as a relation equation like one expressed by Eq. 7 given below. It is to be noted that, symbols $X_1$ and $X_2$ used in the equation denote the 2 pixel values for the white and black colors respectively.

$$E_{reg}(X)=g(X,X_1,X_2) \quad \text{(Eq. 7)}$$

It is to be noted that determination of a function can be said to be application of a given parameter to a relation equation determined in advance. So, the pixel-value restricting means 1207 stores the parameter required for representing the pixel-value restricting function $E_{reg}$ (X) in a memory (not shown in the figure) typically in accordance with a command given by the user. The parameters are the pixel values $X_1$ and $X_2$.

The above description explains a case in which the pixel-value restricting means 1207 determines a pixel-value restricting function making use of the luminance value only. It is to be noted, however, that values used in the pixel-value restricting function determined by the pixel-value restricting means 1207 are by no means limited to the luminance value. If the recovered image is represented by making use of RGB values (that is, $X_R$, $X_G$ and $X_B$) for example, a pixel-value restricting function $E_{reg}$ ($X_R$, $X_G$, $X_B$) can be defined as a relation equation like one expressed by Eq. 8 given as follows.

$$E_{reg}(X_R,X_G,X_B)=g(X_R,X_G,X_B,X_{R1},X_{G1},X_{B1},\ldots,X_{R1},X_{G1},X_{B1}) \quad \text{(Eq. 8)}$$

Symbols ($X_{R1}$, $X_{G1}$, $X_{B1}$) to ($X_{R1}$, $X_{G1}$, $X_{B1}$) used in the above equation are RGB quantities in i pixel values composing the code.

The objective-function determining means 1209 determines an objective function E (X) on the basis of the error function $E_{data}$ (X) stored by the error-function determining means 1206 and the pixel-value restriction information determined by the pixel-value restricting means 1207. The objective function is a function satisfying a relation that, the closer the recovered image to the true image, the more the approach to a result determined in advance. To put it concretely, the objective function E (X) is defined as a function having a value which varies in such a way that, the closer the recovered image to the true image, the smaller the value. For example, if the pixel-value restriction information is defined as a pixel-value restricting function $E_{reg}$ (X), the objective-function determining means 1209 determines an objective function E (X) by making use of the error function $E_{data}$ (X) stored by the error-function determining means 1206 and the pixel-value restricting function $E_{reg}$ (X) determined by the pixel-value restricting means 1207. Then, the objective-function determining means 1209 stores the objective function E (X) determined thereby in a memory (not shown in the figure) or the like. The objective function E (X) is defined in advance as a relation equation like one expressed by Eq. 9 given as follows.

$$E(X)=E_{data}(X)+\alpha \cdot E_{reg}(X) \quad \text{(Eq. 9)}$$

Symbol α used in the above equation denotes a parameter determined in advance by the user. The parameter is used as a weight for the pixel-value restricting function $E_{reg}$ (X) in an operation to find a weighted sum of the error function $E_{data}$ (X) and the pixel-value restricting function $E_{reg}$ (X). To put it concretely, emphasis is placed on the fact that, the larger the weight α, the closer the pixel value of the recovered image to a pixel value determined in advance. On the other hand, the parameter also means that emphasis is placed on the fact that, the smaller the weight α, the closer the pixel value of an image, which is obtained as a result of adding the geometrical deformation and blurs to the recovered image, to the pixel value of the input image. In addition, the value of the parameter α may be determined for each grid of the code. (That is to say, the value of the parameter a may be determined for each pixel of the recovered image).

It is to be noted that, also in this case, determination of a function can be said to be application of a given parameter to a relation equation determined in advance. The objective function E (X) is a function depending on the parameter received in accordance with a command given by the user. When the parameter required for representing the objective function E (X) is received, the objective-function determining means 1209 stores the objective function E (X) in a memory (not shown in the figure). In this case, the parameter is the pixel weight α.

The above description explains a case in which the objective-function determining means 1209 determines an objective function making use of the luminance value only. It is to be noted, however, that values used in the objective-function determined by the objective-function determining means 1209 are by no means limited to the luminance value. If the recovered image is represented by making use of RGB values (that is, $X_R$, $X_G$ and $X_B$) for example, an objective function E ($X_R$, $X_G$, $X_B$) can be defined as a relation equation like one expressed by Eq. 10 given as follows.

$$E(X_R,X_G,X_B)=E_{data}(X_R,X_G,X_B)+\alpha \cdot E_{reg}(X_R,X_G,X_B) \quad \text{(Eq. 10)}$$

The optimized-area specifying means 1208 specifies an area to be optimized. Here, an operation to specify an area to be optimized implies an operation to specify an area in which the input image is to be recovered. For example, let the user or the like specify an area to be optimized. In this case, in accordance with what is specified by the user, the optimized-area specifying means 1208 specifies a pixel which needs to be inferred by making use of the objective function E (X) among the luminance components X of the recovered image from a cell layout inferred by the cell-layout inferring means 1203. It is to be noted that, if the area to be optimized is already known, the optimized-area specifying means 1208 may specify this already known area as an area to be optimized.

Figure 3:
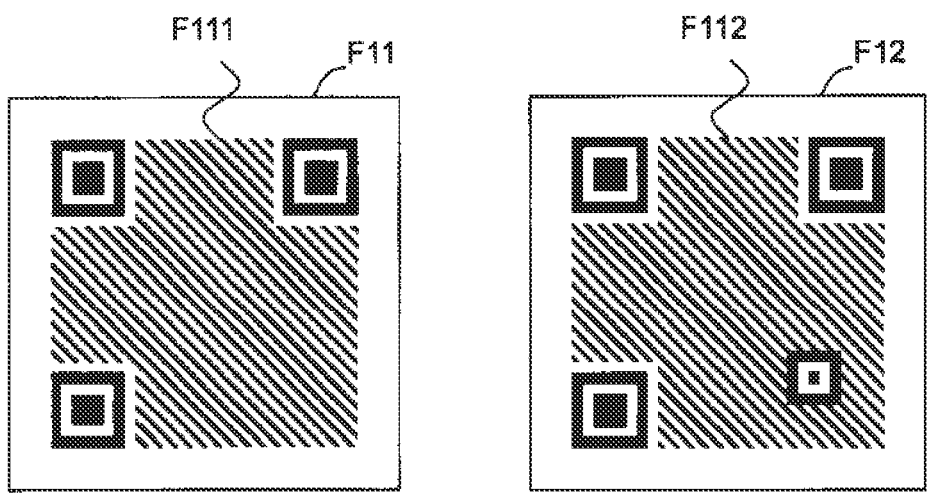
FIG. 3 It depicts an explanatory diagram showing an example of an area which needs to be optimized in a QR code.

The area to be optimized is explained by taking the case of a QR code as an example as follows. FIG. 3 is an explanatory diagram showing an example of an area which needs to be optimized in a QR code. For a pixel in which a marker exists, the user already knows the correct solution. Thus, it is not necessary to infer (or optimize) this area by making use of the objective function E (X). By the same token, it is also not necessary to infer (or optimize) an area other than the QR code by making use of the objective function E (X). Thus, in the case of the image F11 for example, the optimized-area specifying means 1208 specifies other pixels, that is, a hatched partial area F111 of the image F11, as pixels which have to be inferred by making use of the objective function E (X).

In addition, if a plurality of markers having different types exist in the code as shown in the image F12, let the optimized-area specifying means 1208 specify pixels excluding the markers having a plurality of types, that is, a hatched partial area F112 of the image F12, as pixels which have to be inferred by making use of the objective function E (X).

The objective-function optimizing means 1210 determines a recovered image X by optimization of the objective function E (X). To put it concretely, the objective-function optimizing means 1210 computes the recovered image X that minimizes the objective function E (X). For example, the objective-function optimizing means 1210 computes $X_0$ which satisfies Eq. 11 shown below as a typical equation:

$$X_0 = \mathrm{argmin}_X E(X) \quad \text{(Eq. 11)}$$

For example, the objective-function optimizing means 1210 may compute $X_0$ by adoption of typically the conjugate gradient technique. The image found in this way is an image with the objective-function optimized. In other words, the operation to compute the recovered image X that minimizes the objective function E (X) is an operation to optimize the objective function E (X).

The above description explains a case in which the pixel value optimized by the objective-function optimizing means 1210 is the luminance value. It is to be noted, however, that values optimized by the objective-function optimizing means 1210 are by no means limited to the luminance value. If the recovered image is represented by making use of RGB values (that is, $X_R$, $X_G$ and $X_B$) for example, the objective-function optimizing means 1210 merely needs to compute the $X_R$, $X_G$ and $X_B$ values which minimize the objective function E ($X_R$, $X_G$, $X_B$). The $X_R$, $X_G$ and $X_B$ values which minimize the objective function E ($X_R$, $X_G$, $X_B$) are $X_{R0}$, $X_{G0}$ and $X_{B0}$.

The pixel-value discretizing means 1211 generates a recovered image through discretazion of the pixel values of $X_0$, which is computed by the objective-function optimizing means 1210, by making use of a threshold value given in advance by the user. By discretazion of the pixel values of $X_0$, the luminance values of all pixels in an area included in the code within the recovered image change from $X_1$ to any of $X_i$ values. For example, if the luminance value is discretized into two values, one threshold value is set in advance. At that time, if the pixel value of $X_0$ is not smaller than the threshold value, let the pixel-value discretizing means 1211 discretize the luminance value into $X_1$. If the pixel value of $X_0$ is smaller than the threshold value, on the other hand, let the pixel-value discretizing means 1211 discretize the luminance value into $X_2$. Then, the pixel-value discretizing means 1211 outputs the image having the pixel values thereof discretized to the image outputting means 1300.

The above description explains a case in which the pixel value discretized by the pixel-value discretizing means 1211 is the luminance value. It is to be noted, however, that values discretized by the pixel-value discretizing means 1211 are by no means limited to the luminance value. If the recovered image is represented by making use of RGB values for example, let the pixel-value discretizing means 1211 replace the pixel values computed by the objective-function optimizing means 1210 for pixels with closest pixel values composing the code.

It is to be noted that $X_0$ determined by the objective-function optimizing means 1210 by optimization of the objective function can also be used as the recovered image X. In this case, however, the pixel-value discretizing means 1211 is capable of finding a clearer 2-dimensional code by discretization of the pixel value.

The marker detecting means 1201 and the marker-area blur removing means 1202 are implemented by typically the CPU of a computer which operates in accordance with an executed program (that is, an image processing program). In actuality, the marker-area blur removing means 1202 has the cell-layout inferring means 1203, the blur-function determining means 1204, the geometrical-deformation inferring means 1205, the error-function determining means 1206, the pixel-value restricting means 1207, the optimized-area specifying means 1208, the objective-function determining means 1209, the objective-function optimizing means 1210 and the pixel-value discretizing means 1211 as described above. For example, the program has been stored in a storage section (not shown in the figure) of an apparatus in an image processing system. In this case, the CPU reads out the program from the storage section and executes the program in order to carry out the operations of the marker detecting means 1201 and the marker-area blur removing means 1202. To put it concretely, the CPU executes the program in order to carry out the operations of the marker detecting means 1201, cell-layout inferring means 1203, blur-function determining means 1204, geometrical-deformation inferring means 1205, error-function determining means 1206, pixel-value restricting means 1207, optimized-area specifying means 1208, objective-function determining means 1209, objective-function optimizing means 1210 and pixel-value discretizing means 1211.

As an alternative, the marker detecting means 1201 and the marker-area blur removing means 1202 can each be implemented by special hardware. In actuality, the marker-area blur removing means 1202 has the cell-layout inferring means 1203, the blur-function determining means 1204, the geometrical-deformation inferring means 1205, the error-function determining means 1206, the pixel-value restricting means 1207, the optimized-area specifying means 1208, the objective-function determining means 1209, the objective-function optimizing means 1210 and the pixel-value discretizing means 1211 as described above.

Figure 4:
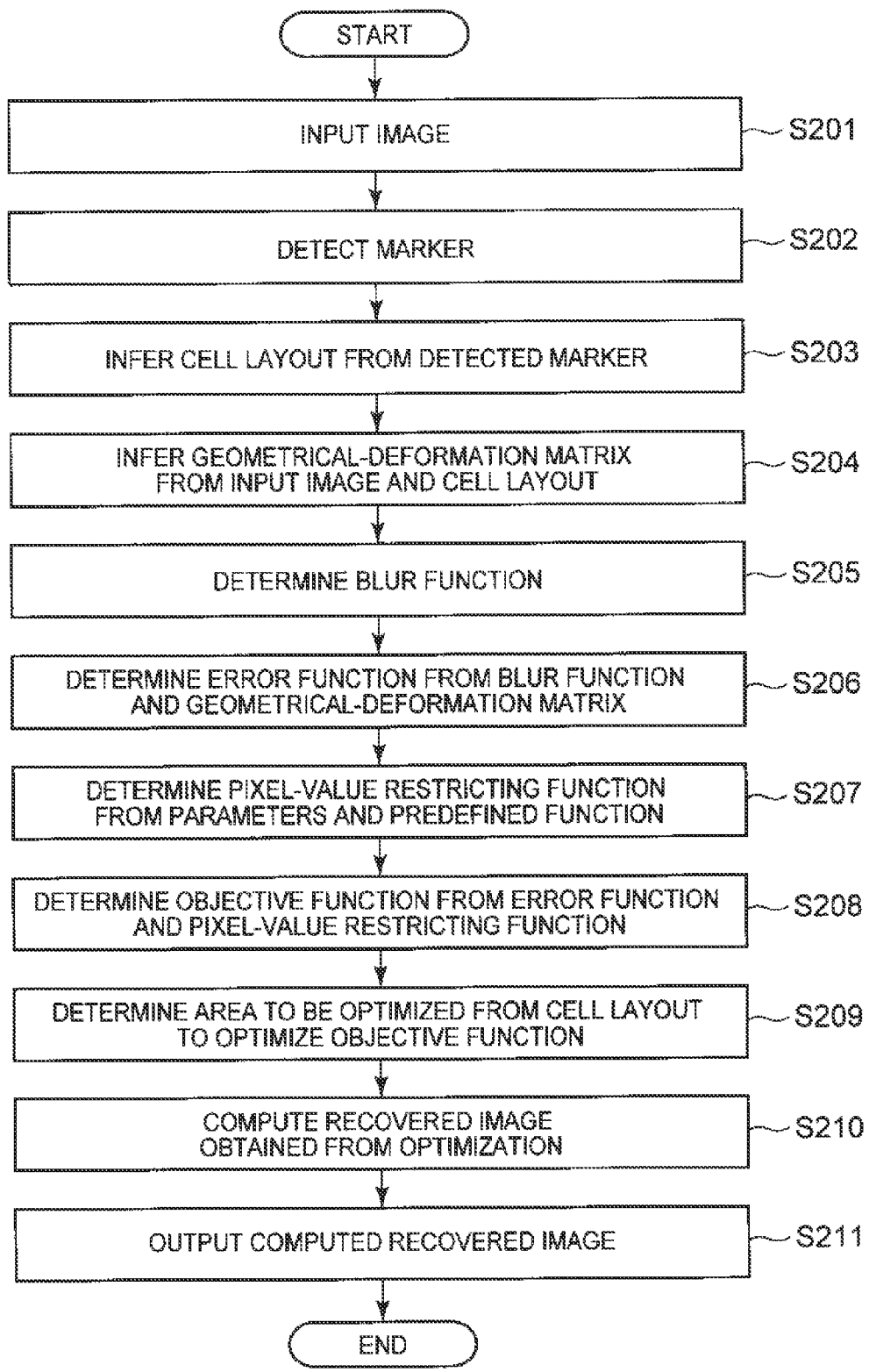
FIG. 4 It depicts a flowchart showing examples of operations carried out by the image processing system according to the first exemplary embodiment.

Next, operations carried out by the image processing system according to this exemplary embodiment are explained as follows. FIG. 4 is a flowchart showing examples of the operations carried out by the image processing system according to the first exemplary embodiment. First of all, at a step S201, an input image is supplied to the image inputting means 1100 which then stores the input image in a memory shown in none of the figures. Then, at the next step S202, the marker detecting means 1201 detects a marker from the input image stored by the image inputting means 1100 in the memory shown in none of the figures. It is to be noted that, if no marker was detected, the processing can be finished. Subsequently, at the next step S203, the cell-layout inferring means 1203 infers a cell layout from the marker.

Then, at the next step S204, the geometrical-deformation inferring means 1205 infers a geometrical-deformation matrix W from the input image and the cell layout. In addition, at the next step S205, the blur-function determining means 1204 determines a blur function B. Subsequently, at the next step S206, the error-function determining means 1206 determines an error function from the determined blur function B and the inferred geometrical-deformation matrix W and, then, at the same step, the error-function determining means 1206 stores the error function in a memory shown in none of the figures.

Then, at the next step S207, the pixel-value restricting means 1207 receives parameters used for representing a pixel-value restricting function requested by the user on the basis of the cell layout stored by the cell-layout inferring means 1203 in the memory shown in none of the figures. Subsequently, at the same step, the pixel-value restricting means 1207 determines the pixel-value restricting function on the basis of the parameters and a function defined in advance, storing the pixel-value restricting function determined thereby in a memory shown in none of the figures.

Then, at the next step S208, the objective-function determining means 1209 determines an objective function from the error function stored by the error-function determining means 1206 in the memory shown in none of the figures and the pixel-value restricting function stored by the pixel-value restricting means 1207 in the memory shown in none of the figures, storing the objective function determined thereby in a memory shown in none of the figures.

Then, when the optimized-area specifying means 1208 specifies an area to be optimized by making use of the objective function from the cell layout inferred by the cell-layout inferring means 1203, the objective-function optimizing means 1210 optimizes the objective function for the area at the next step S209. Subsequently, at the next step S210, the pixel-value discretizing means 1211 discretizes the pixel values for a result obtained by optimization of the objective function and finds a recovered image. Finally, at a step S211, the image outputting means 1300 outputs the recovered image found by the pixel-value discretizing means 1211.

Next, effects exhibited by this exemplary embodiment are explained. As described above, in accordance with this exemplary embodiment, the error-function determining means 1206 makes use of the blur function B and the geometrical-deformation matrix W in order to determine an error function $E_{data}$ having a value which varies in such a way that, the smaller the error between the input image Y and an image resulting from addition of geometrical deformations and blurs to a recovered image X obtained by recovering the blurred image, the smaller the value of the error function $E_{data}$. In addition, the pixel-value restricting means 1207 determines pixel-value restriction information. Then, the objective-function determining means 1209 determines an objective function on the basis of the error function $E_{data}$ and the pixel-value restriction information. Subsequently, the objective-function optimizing means 1210 optimizes the objective function in order to determine the recovered image X. Thus, an accurate recovered image can be obtained from a much blurred code image.

That is to say, since this exemplary embodiment makes use of an objective function determined on the basis of a plurality of restrictions related to a code image, a defect setting problem having the restrictions is solved and the solution to this problem is stable. Thus, a more accurate recovered image can be obtained even from a much blurred image.

Next, a typical modified version of this exemplary embodiment is explained. The above description explains an exemplary embodiment in which the pixel-value restricting means 1207 defines the pixel-value restricting function $E_{reg}(X)$ as pixel-value restriction information and determines the pixel-value restricting function $E_{reg}(X)$ as a restriction condition. In this modified version, on the other hand, as pixel-value restriction information, the pixel-value restricting means 1207 determines a restriction condition requiring that possible pixel values of an image to be recovered be a small number of discrete values.

The pixel-value restricting means 1207 determines the pixel values $X_1$ to $X_i$ composing a code as a restriction condition from the cell layout inferred by the cell-layout inferring means 1203. The pixel values $X_1$ to $X_i$ can be values given by the user or values dynamically inferred by the pixel-value restricting means 1207 from the cell layout. For example, if the code to be recovered is a QR code, the pixel-value restricting means 1207 may compute the maximum and minimum values of luminance values in the QR code from the cell layout inferred by the cell-layout inferring means 1203, taking the maximum and minimum values as $X_1$ and $X_2$. Then, the pixel-value restricting means 1207 stores $X_1$ to $X_i$ determined thereby in a memory (shown in none of the figures) or the like.

It is to be noted that values determined by the pixel-value restricting means 1207 to be used in the pixel-value restricting function are by no means limited to the luminance value. If the recovered image is represented by making use of RGB values (that is, $X_R$, $X_G$ and $X_B$) for example, the pixel-value restricting means 1207 may determine pixel values ($X_{R1}$, $X_{G1}$, $X_{B1}$) to ($X_{Ri}$, $X_{Gi}$, $X_{Bi}$) used for restricting the code as a restriction condition.

From the error function $E_{data}(X)$ stored by the error-function determining means 1206 and the pixel values $X_1$ to $X_i$ determined by the pixel-value restricting means 1207 to serve as pixel values composing the code, the objective-function determining means 1209 determines an objective function E (X) defined by typically Eq. 12 as follows:

$$E(X)=h(|B \cdot W \cdot X - Y|) \qquad \text{(Eq. 12)}$$

In this case, notation h (·) is a function having a value varying in such a way that, the smaller the value of the argument ·, the smaller the value of the function. In addition, notation |·| represents a vector norm. On top of that, the objective-function determining means 1209 may also determine an objective function E (X) defined by typically Eq. 13 given below in place of Eq. 12.

$$E(X) = -2Y^T \cdot B \cdot W \cdot X + X^T \cdot W^T \cdot B^T \cdot B \cdot W \cdot X \qquad \text{(Eq. 13)}$$

Also in the case of the objective function E (X) defined by Eq. 12 or Eq. 13, however, there is a restriction requiring that the components of X take only the pixel values $X_1$ to $X_i$, which have been determined by the pixel-value restricting means 1207, as the values of the components.

It is to be noted that the values to be used in the objective function determined by the objective-function determining means 1209 are by no means limited to the luminance value. If the recovered image is represented by making use of RGB values (that is, $X_R$, $X_G$ and $X_B$) for example, the objective-function determining means 1209 may define an objective function E ($X_R$, $X_G$, $X_B$) as a relation equation like one expressed by typically Eq. 14 or Eq. 15 as follows.

$$E(X_R, X_G, X_B) = \qquad \text{(Eq. 14)}$$
$$h(|B \cdot W \cdot X_R - Y_R|) + h(|B \cdot W \cdot X_G - Y_G|) + h(|B \cdot W \cdot X_B - Y_B|)$$

$$E(X_R, X_G, X_B) = -2Y_R^T \cdot B \cdot W \cdot X_R^T + X_R^T \cdot W^T \cdot B^T \cdot B \cdot W \cdot X_R - \qquad \text{(Eq. 15)}$$
$$2Y_G^T \cdot B \cdot W \cdot X_G^T + X_G^T \cdot W^T \cdot B^T \cdot B \cdot W \cdot X_G -$$
$$2Y_B^T \cdot B \cdot W \cdot X_B^T + X_B^T \cdot W^T \cdot B^T \cdot B \cdot W \cdot X_B$$

Also in the case of the objective function E ($X_R$, $X_G$, $X_B$) defined by Eq. 14 or Eq. 15, however, there is a restriction requiring that the components of $X_R$, $X_G$ and $X_B$ take only the pixel values $X_1$ to $X_i$, which have been determined by the pixel-value restricting means 1207, as the values of the components.

The objective-function optimizing means 1210 optimizes the objective function E (X). To put it concretely, the objective-function optimizing means 1210 computes X which minimizes the objective function E (X). The objective-function optimizing means 1210 optimizes the objective function E (X) by adoption of typically the discrete multi-value optimization technique. It is to be noted that, as a typical optimization technique, the objective-function optimizing means 1210 may adopt Graph Cuts, Fusion Move, Quadratic Pseudo-Boolean Optimization, Belief Propagation or the like.

That is to say, in this exemplary embodiment, the objective-function optimizing means 1210 optimizes the objective function by adoption of typically the conjugate gradient technique. In the case of the modified version, on the other hand, when the objective-function optimizing means 1210 optimizes the objective function, it is possible to adopt the discrete multi-value optimization technique.

Second Exemplary Embodiment

Figure 5:
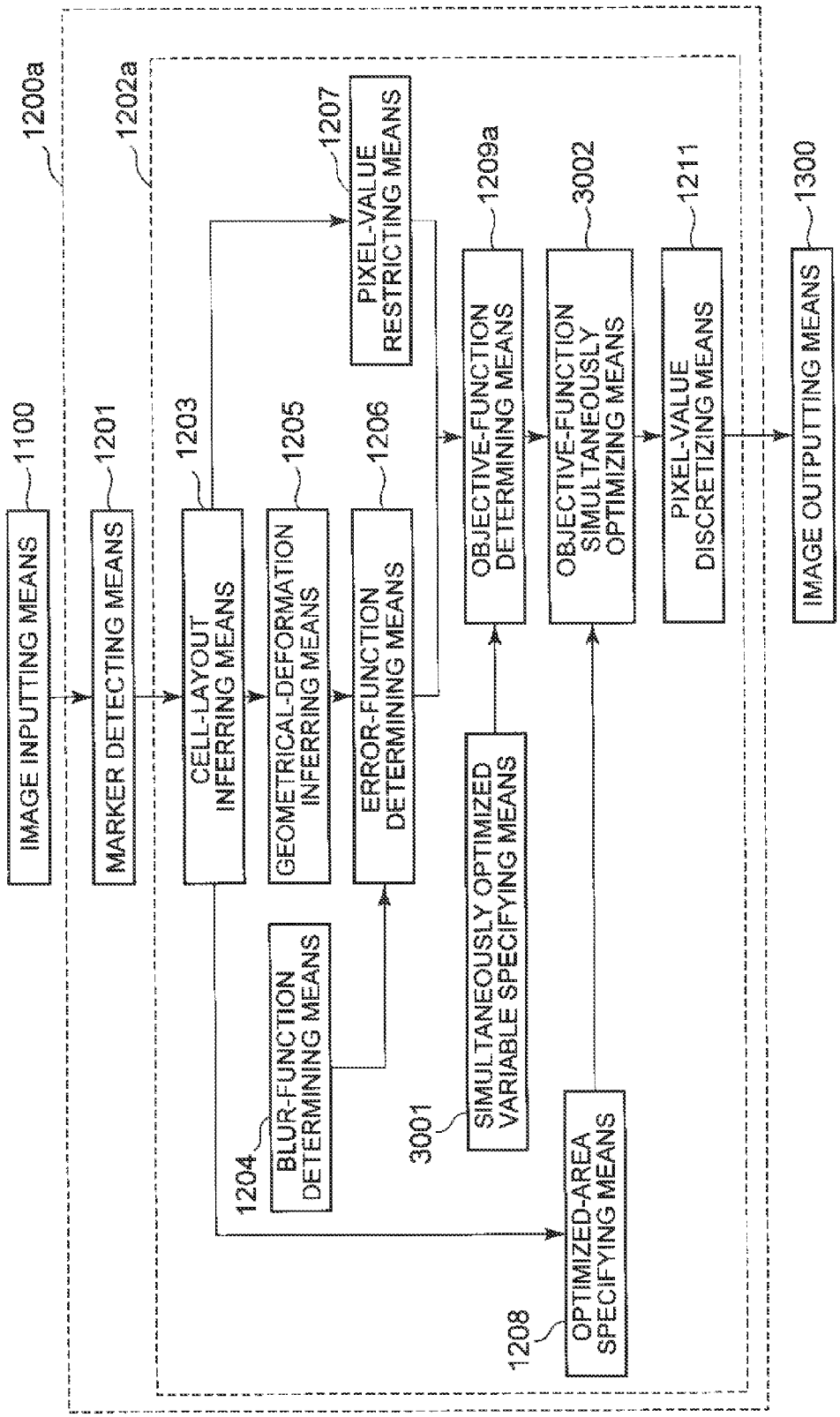
FIG. 5 It depicts a block diagram showing an example of an image processing system according to a second exemplary embodiment of the present invention.

Next, an image processing system according to a second exemplary embodiment of the present invention is explained as follows. It is to be noted that, for configurations identical with the first exemplary embodiment, the same reference numerals as the first exemplary embodiment are used and explanation of the identical configurations is omitted. FIG. 5 is a block diagram showing an example of the image processing system according to the second exemplary embodiment of the present invention. The image processing system according to the second exemplary embodiment includes image inputting means 1100, a computer 1200a operating in accordance with program control and image outputting means 1300. Much like the first exemplary embodiment, the computer 1200a is also referred to as a central processing apparatus, a processor or a data processing apparatus.

The computer 1200a includes marker detecting means 1201 and marker-area blur removing means 1202a. In addition, the marker-area blur removing means 1202a further includes cell-layout inferring means 1203, blur-function determining means 1204, geometrical-deformation inferring means 1205, error-function determining means 1206, pixel-value restricting means 1207, optimized-area specifying means 1208, objective-function determining means 1209a, simultaneously optimized variable specifying means 3001, objective-function simultaneously optimizing means 3002 and pixel-value discretizing means 1211.

Since the image inputting means 1100, the marker detecting means 1201, the cell-layout inferring means 1203, the blur-function determining means 1204, the geometrical-deformation inferring means 1205, the error-function determining means 1206, the pixel-value restricting means 1207, the optimized-area specifying means 1208, the pixel-value discretizing means 1211 and the image outputting means 1300 are identical with their counterparts employed in the first exemplary embodiment, their explanation is omitted.

An object (or an element) treated as a variable is selected among parameters supplied to an objective function determined by the objective-function determining means 1209a to be described later, being specified to the simultaneously optimized variable specifying means 3001. To put it concretely, the objective function is a function represented by a blur function B, a geometrical-deformation matrix W and a small number of discretized pixel values composing a code in addition to a recovered image X. In this case, the user selects variables among these elements and specifies the selected elements to the simultaneously optimized variable specifying means 3001.

It is to be noted that, in order to lower the degree of freedom of a variable selected as an element described above, the blur function B and the geometrical-deformation matrix W can each be represented as a function based on a small number of parameters. Then, these parameters may be supplied to the simultaneously optimized variable specifying means 3001 as variables to be optimized at the same time.

The objective-function determining means 1209a stores the objective function determined with the element specified to the simultaneously optimized variable specifying means 3001 and X used as its arguments in a memory (not shown in the figure) or the like. For example, if the blur matrix B and the geometrical-deformation matrix W are specified to the simultaneously optimized variable specifying means 3001 as variables, let the objective-function determining means 1209a determine E (X, W, B) as the objective function.

The objective-function simultaneously optimizing means 3002 optimizes elements specified to the simultaneously optimized variable specifying means 3001 and X at the same time. For example, if the objective function is E (X, W, B), the objective-function simultaneously optimizing means 3002 computes a set of X, W and B which minimize the objective function E (X, W, B). To put it concretely, the objective-function simultaneously optimizing means 3002 computes a set of $X_0$, $W_0$ and $B_0$ which satisfy Eq. 16 given as follows.

$$X_0, W_0, B_0 = \mathrm{argmin}_{X,W,B} E(X, W, B) \quad \text{(Eq. 16)}$$

The objective-function simultaneously optimizing means 3002 may carry out the optimization by adoption of an EM (Expectation Maximization) algorithm or the like.

It is to be noted that the marker detecting means 1201 and the marker-area blur removing means 1202a are implemented typically by typically the CPU of a computer which operates in accordance with an executed program (that is, an image processing program). In actuality, the marker-area blur removing means 1202 has the cell-layout inferring means 1203, the blur-function determining means 1204, the geometrical-deformation inferring means 1205, the error-function determining means 1206, the pixel-value restricting means 1207, the optimized-area specifying means 1208, the objective-function determining means 1209a, the simultaneously optimized variable specifying means 3001, the objective-function simultaneously optimizing means 3002 and pixel-value discretizing means 1211 as described above.

Figure 6:
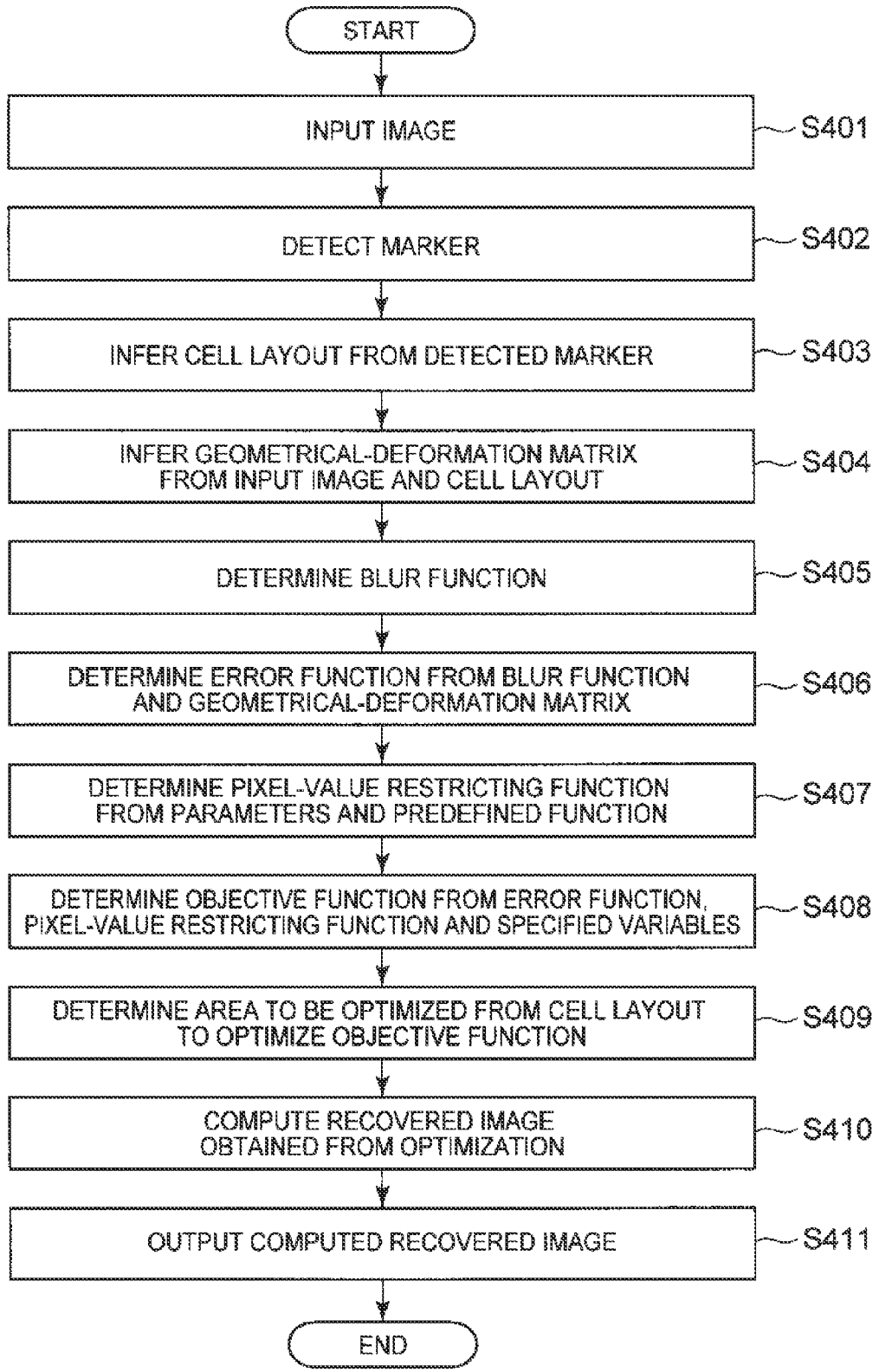
FIG. 6 It depicts a flowchart showing an example of operations carried out by the image processing system according to the second exemplary embodiment.

Next, operations carried out by the image processing system according to this exemplary embodiment are explained as follows. FIG. 6 is a flowchart showing examples of the operations carried out by the image processing system according to the second exemplary embodiment. First of all, at a step S401, an input image is supplied to the image inputting means 1100 which then stores the input image in a memory shown in none of the figures. Then, at the next step S402, the marker detecting means 1201 detects a marker from the input image stored by the image inputting means 1100 in the memory shown in none of the figures. Subsequently, at the next step S403, the cell-layout inferring means 1203 infers a cell layout from the marker.

Then, at the next step S404, the geometrical-deformation inferring means 1205 infers a geometrical-deformation matrix W from the input image and the cell layout. In addition, at the next step S405, the blur-function determining means 1204 determines a blur function B. Subsequently, at the next step S406, the error-function determining means 1206 determines an error function from the determined blur function B and the inferred geometrical-deformation matrix W and, then, the error-function determining means 1206 stores the error function in a memory shown in none of the figures.

Then, at the next step S407, the pixel-value restricting means 1207 receives parameters used for representing a pixel-value restricting function requested by the user on the basis of the cell layout stored by the cell-layout inferring means 1203 in the memory shown in none of the figures. Subsequently, at the same step, the pixel-value restricting means 1207 determines the pixel-value restricting function on the basis of the parameters and a function defined in advance, storing the pixel-value restricting function determined thereby in a memory shown in none of the figures.

Then, at the next step S408, the objective-function determining means 1209a determines an objective function from the error function stored by the error-function determining means 1206 in the memory shown in none of the figures, the pixel-value restricting function stored by the pixel-value restricting means 1207 in the memory shown in none of the figures and the variables specified to the simultaneously optimized variable specifying means 3001, storing the objective function determined thereby in a memory shown in none of the figures.

Then, when the optimized-area specifying means 1208 specifies an area to be optimized by making use of the objective function from the cell layout inferred by the cell-layout inferring means 1203, the objective-function simultaneously optimizing means 3002 optimizes the objective function for the area at the next step S409. Subsequently, at the next step S410, the pixel-value discretizing means 1211 discretizes the pixel values for a result obtained by optimization of the objective function and finds a recovered image. Finally, at a step S411, the image outputting means 1300 outputs the recovered image found by the pixel-value discretizing means 1211.

As described above, in accordance with the second exemplary embodiment, in addition to the operations carried out by the first exemplary embodiment, the objective-function simultaneously optimizing means 3002 optimizes a variable selected among variables of the objective function and specified to the simultaneously optimized variable specifying means 3001. To put it concretely, the second exemplary embodiment is configured to simultaneously optimize also the already inferred geometrical-deformation matrix W, the already inferred blur function B and a small number of discretized pixel values composing the code in an operation to optimize the objective function. Thus, if errors have been generated in the geometrical-deformation matrix W, the blur function B and/or a small number of discretized pixel values composing the code, an accurate recovered image can be obtained by correcting the errors. As a result, it is possible to obtain a recovered image which is accurate in comparison with the first exemplary embodiment.

Third Exemplary Embodiment

Figure 7:
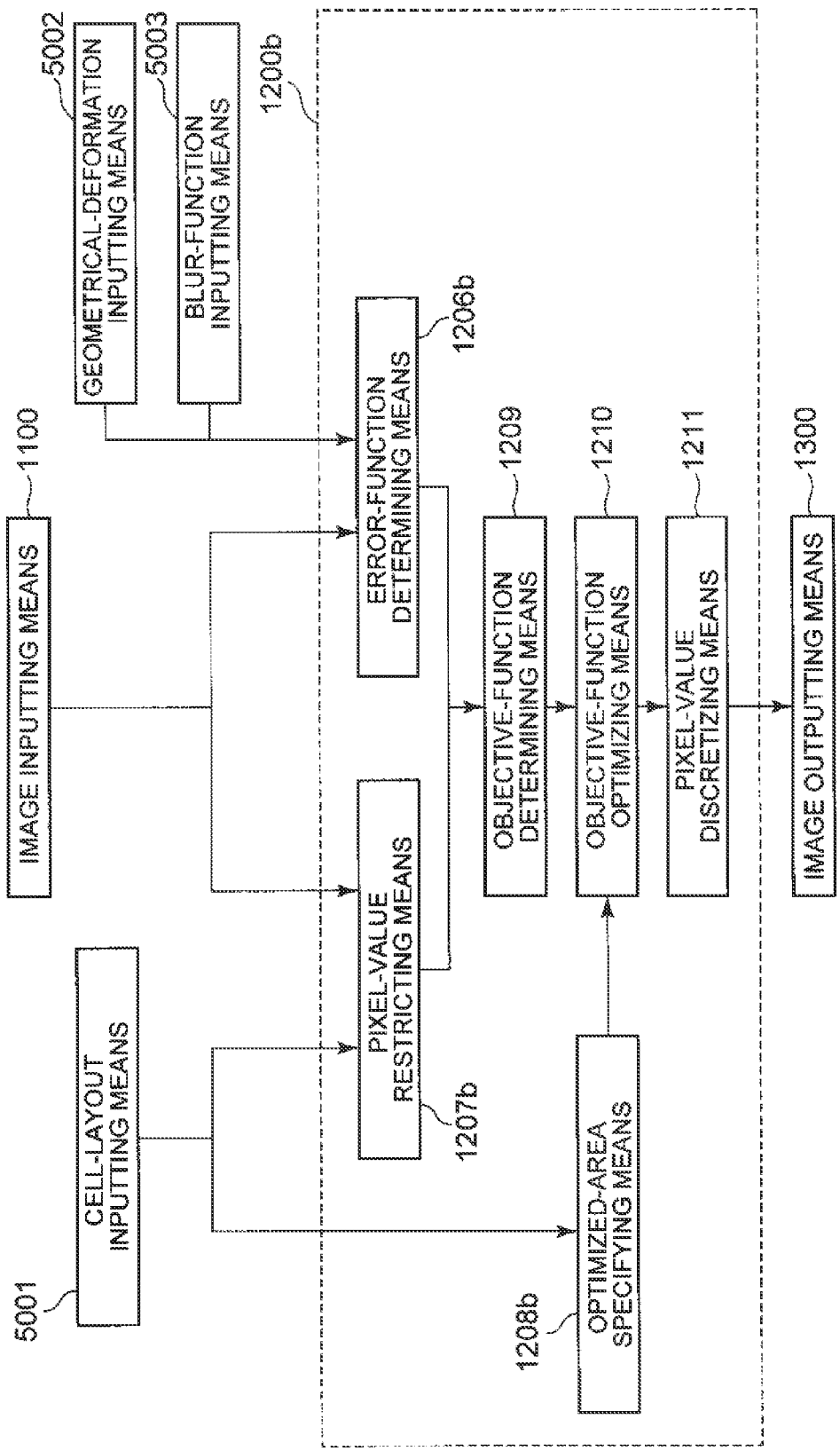
FIG. 7 It depicts a block diagram showing an example of an image processing system according to a third exemplary embodiment of the present invention.

Next, an image processing system according to a third exemplary embodiment of the present invention is explained as follows. It is to be noted that, for configurations identical with the first exemplary embodiment, the same reference numerals as the first exemplary embodiment are used and explanation of the identical configurations is omitted. FIG. 7 is a block diagram showing an example of the image processing system according to the third exemplary embodiment of the present invention. The image processing system according to the third exemplary embodiment includes image inputting means 1100, a computer 1200b operating in accordance with program control, image outputting means 1300, cell-layout inputting means 5001, geographical-deformation inputting means 5002 and blur-function inputting means 5003. Much like the first exemplary embodiment, the computer 1200b is also referred to as a central processing apparatus, a processor or a data processing apparatus.

The computer 1200b includes error-function determining means 1206b, pixel-value restricting means 1207b, optimized-area specifying means 1208b, objective-function determining means 1209, objective-function optimizing means 1210 and pixel-value discretizing means 1211. It is to be noted that, since the image inputting means 1100, the objective-function determining means 1209, the objective-function optimizing means 1210 and the image outputting means 1300 are identical with their counterparts employed in the first exemplary embodiment, their explanation is omitted.

Parameters representing the cell layout and the area of a marker are supplied to the cell-layout inputting means 5001. Typical parameters representing the cell layout include the number of cells in the code. The values supplied to the cell-layout inputting means 5001 can be values determined in advance by the user or values originated by a sensor or the like.

An input image and a geometrical-deformation matrix W serving as a matrix representing deformations of a recovered image are supplied to the geographical-deformation inputting means 5002. Then, the geographical-deformation inputting means 5002 stores the geometrical-deformation matrix W in a memory (not shown in the figure) or the like. Much like the cell-layout inputting means 5001, the values supplied to the geographical-deformation inputting means 5002 can be values determined in advance by the user or values originated by a sensor or the like.

A blur function B is supplied to the blur-function inputting means 5003. Then, the blur-function inputting means 5003 stores the blur function B in a memory (not shown in the figure) or the like. Much like the cell-layout inputting means 5001, the values supplied to the blur-function inputting means 5003 can be values determined in advance by the user or values originated by a sensor or the like.

The error-function determining means 1206b makes use of the input image, the geometrical-deformation matrix W and the blur function B in order to determine an error function. The input image is an image supplied to the image inputting means 1100 and stored in a memory (not shown in the figure) or the like. The geometrical-deformation matrix W is a matrix supplied to the geographical-deformation inputting means 5002 and stored in a memory (not shown in the figure) or the like. The blur function B is a function supplied to the blur-function inputting means 5003 and stored in a memory (not shown in the figure) or the like. Then, the error-function determining means 1206b stores the error function determined thereby in a memory (not shown in the figure) or the like. Much like the first exemplary embodiment, let the error function be defined in advance as a relation equation expressed by typically Eq. 3.

The pixel-value restricting means 1207b determines a pixel-value restricting function and stores the pixel-value restricting function determined thereby in a memory (not shown in the figure) or the like. The parameters of the pixel-value restricting function are supplied by the user or the like on the basis of the input image stored in the image inputting means 1100 and the cell layout stored in the cell-layout inputting means 5001. Much like the first exemplary embodiment, let the pixel-value restricting function be defined in advance as a relation equation expressed by typically Eq. 6.

The optimized-area specifying means 1208b specifies an area to be recovered by making use of the objective function, which has been determined by objective-function determining means 1209, on the basis of the cell layout and the marker area which have been supplied to the cell-layout inputting means 5001. It is to be noted that the method adopted by the optimized-area specifying means 1208b to specify the area is the method adopted by the optimized-area specifying means 1208 according to the first exemplary embodiment to specify an area.

It is to be kept in mind that the error-function determining means 1206b, the pixel-value restricting means 1207b, the optimized-area specifying means 1208b, the objective-function determining means 1209, the objective-function optimizing means 1210 and the pixel-value discretizing means 1211 are implemented typically by typically the CPU of a computer which operates in accordance with an executed program (that is, an image processing program).

Figure 8:
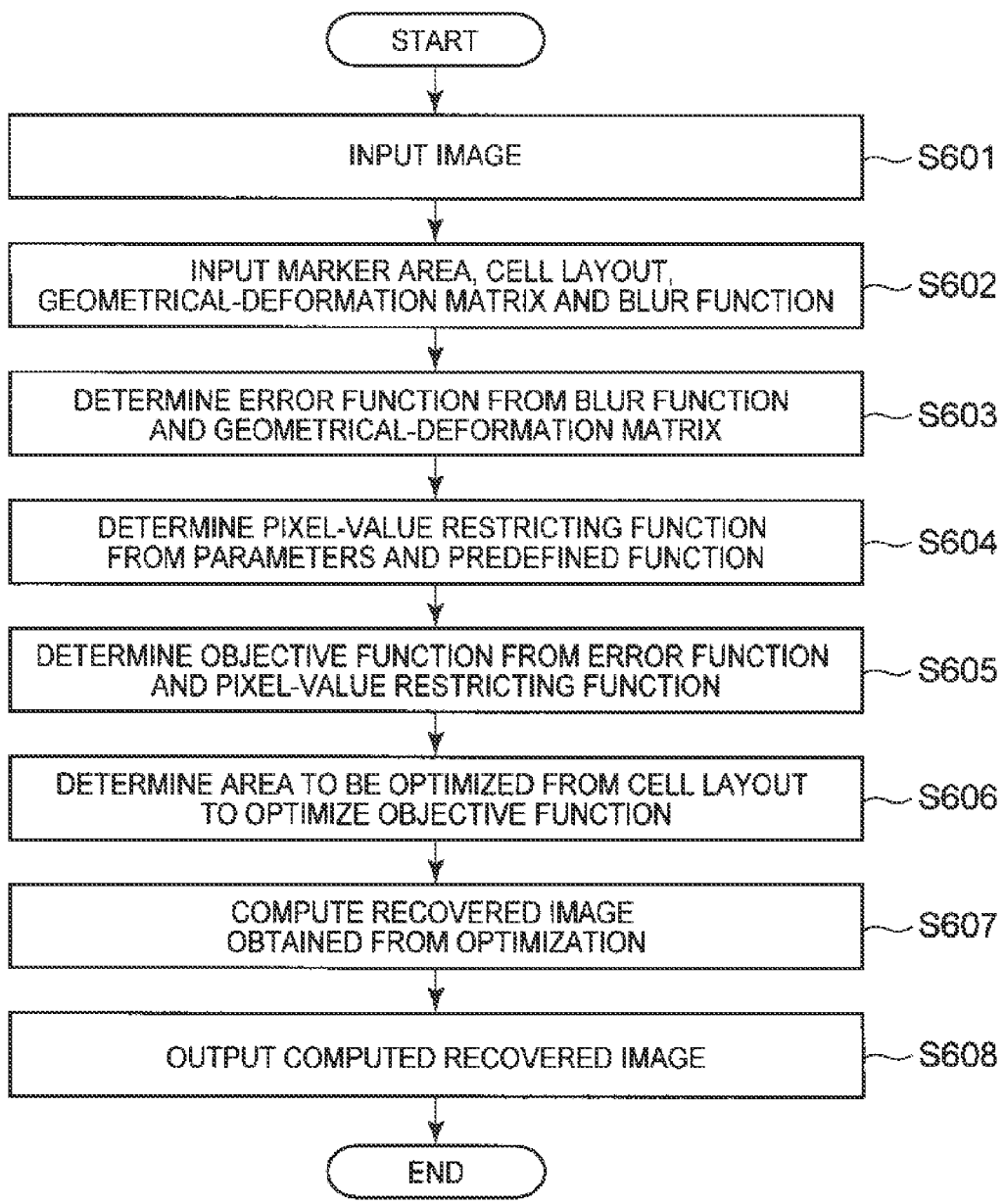
FIG. 8 It depicts a flowchart showing an example of operations carried out by the image processing system according to the third exemplary embodiment.

Next, operations carried out by the image processing system according to this exemplary embodiment are explained as follows. FIG. 8 is a flowchart showing examples of the operations carried out by the image processing system according to the third exemplary embodiment. First of all, at a step S601, an input image is supplied to the image inputting means 1100 which then stores the input image in a memory shown in none of the figures. Then, at the next step S602, a cell layout and the area of a marker are supplied to the cell-layout inputting means 5001 whereas a geometrical-deformation matrix W is supplied to the geographical-deformation inputting means 5002. In addition, at the same step, a blur function B is supplied to the blur-function inputting means 5003 and these pieces of information supplied to the cell-layout inputting means 5001, the geographical-deformation inputting means 5002 as well as the blur-function inputting means 5003 are stored in a memory shown in none of the figures.

Then, at the next step S603, the error-function determining means 1206b determines an error function from the geometrical-deformation matrix W and the blur function B which have been stored in a memory, storing the error function determined thereby in a memory shown in none of the figures. Then, at the next step S604, the pixel-value restricting means 1207b receives parameters supplied by the user on the basis of the cell layout supplied to the cell-layout inputting means 5001 as parameters used for representing a pixel-value restricting function. Then, at the same step, the pixel-value restricting means 1207b determines the pixel-value restricting function on the basis of the parameters and a function defined in advance, storing the pixel-value restricting function determined thereby in a memory shown in none of the figures.

Then, at the next step S605, the objective-function determining means 1209 determines an objective function from the error function and the pixel-value restricting function, storing the objective function determined thereby in a memory shown in none of the figures. As described above, the error function has been stored by the error-function determining means 1206b in a memory shown in none of the figures whereas the pixel-value restricting function has been stored by the pixel-value restricting means 1207b in a memory shown in none of the figures.

Then, at the next step S606, when the optimized-area specifying means 1208b specifies an area for which the objective function is to be optimized from the cell layout supplied to the cell-layout inputting means 5001, the objective-function optimizing means 1210 optimizes the objective function for the area. Then, at the next step S607, the pixel-value discretizing means 1211 discretizes pixel values for a result obtained by optimization of the objective function in order to compute a recovered image. Finally, at a step S608, the image outputting means 1300 outputs the recovered image found by the pixel-value discretizing means 1211.

As described above, in accordance with this exemplary embodiment, a cell layout and the area of a marker are supplied to the cell-layout inputting means 5001 whereas a geometrical-deformation matrix W is supplied to the geographical-deformation inputting means 5002. In addition, a blur function B is supplied to the blur-function inputting means 5003. That is to say, in the case of this exemplary embodiment, an objective function is defined by making use of a cell layout, a geometrical-deformation matrix W and a blur function B which have been specified in advance. Thus, an accurate objective function can be made. As a result, it is possible to obtain a recovered image which is accurate in comparison with the first exemplary embodiment.

Fourth Exemplary Embodiment

Figure 9:
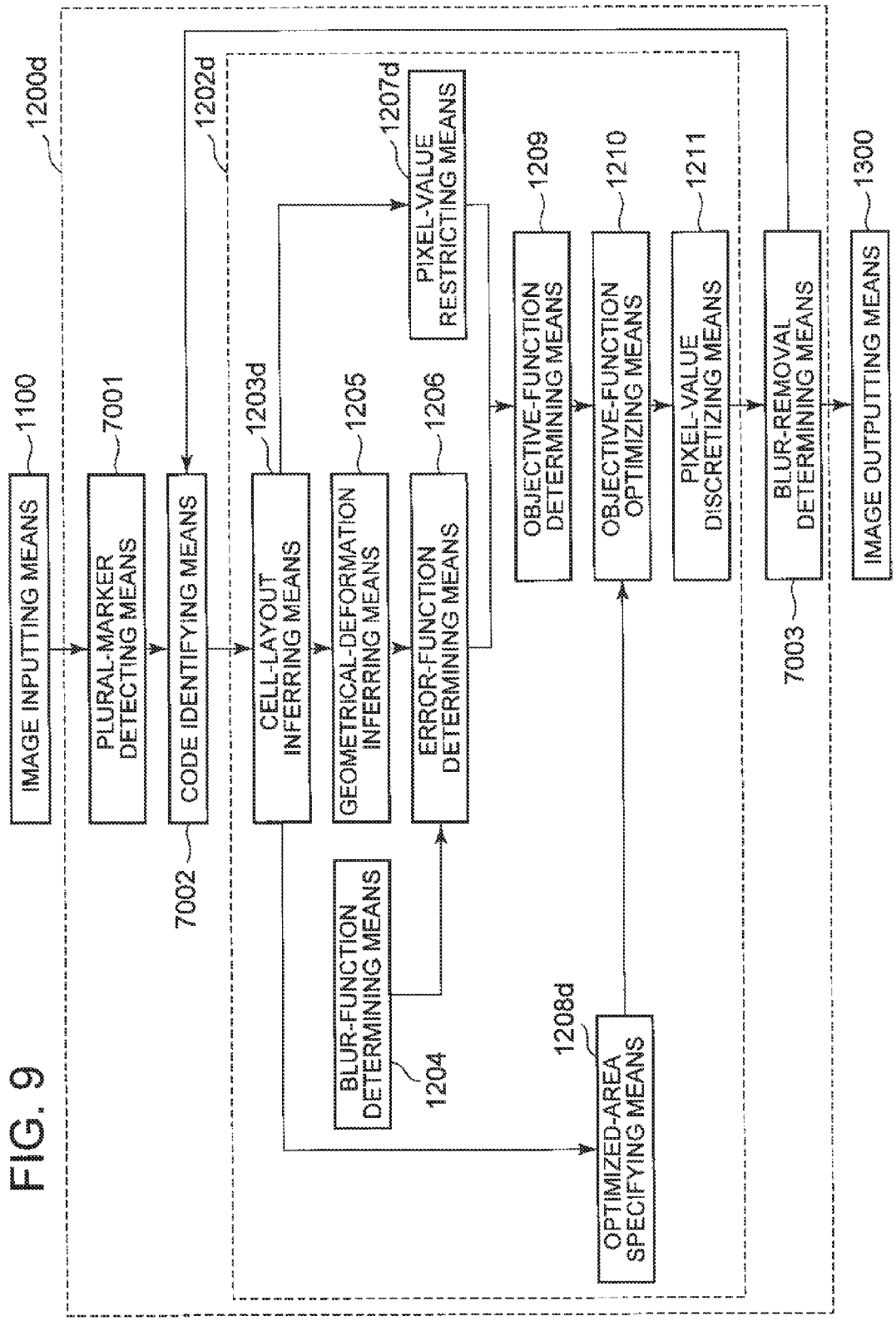
FIG. 9 It depicts a block diagram showing an example of an image processing system according to a fourth exemplary embodiment of the present invention.

Next, an image processing system according to a fourth exemplary embodiment of the present invention is explained as follows. It is to be noted that, for configurations identical with the first exemplary embodiment, the same reference numerals as the first exemplary embodiment are used and explanation of the identical configurations is omitted. FIG. 9 is a block diagram showing an example of the image processing system according to the fourth exemplary embodiment of the present invention. The image processing system according to the fourth exemplary embodiment includes image inputting means 1100, a computer 1200d operating in accordance with program control and image outputting means 1300. Much like the first exemplary embodiment, the computer 1200d is also referred to as a central processing apparatus, a processor or a data processing apparatus.

The computer 1200d includes plural-marker detecting means 7001, code identifying means 7002, marker-area blur removing means 1202d and blur-removal determining means 7003. In addition, the marker-area blur removing means 1202d further includes cell-layout inferring means 1203d, blur-function determining means 1204, geometrical-deformation inferring means 1205, error-function determining means 1206, pixel-value restricting means 1207d, optimized-area specifying means 1208d, objective-function determining means 1209, objective-function optimizing means 1210 and pixel-value discretizing means 1211.

Since the image inputting means 1100, the blur-function determining means 1204, the geometrical-deformation inferring means 1205, the error-function determining means 1206, the objective-function determining means 1209, the objective-function optimizing means 1210, the pixel-value discretizing means 1211 and the image outputting means 1300 are identical with their counterparts employed in the first exemplary embodiment, their explanation is omitted.

If a plurality of markers with different types exist, the plural-marker detecting means 7001 detects all these markers and stores the detected markers in a memory (not shown in the figure) or the like. For each of the detected markers, the code identifying means 7002 identifies the type of the code for the marker and stores the type identified thereby in a memory (not shown in the figure) or the like.

In general, the layout of cells or the like vary from code type to code type. For this reason, information showing the association of the cell layout with the code type is stored in advance in a memory (not shown in the figure) or the like so that the code identifying means 7002 is capable of identifying the code at the same time as a time at which the plural-marker detecting means 7001 detects a marker.

In accordance with the type of the code identified by the code identifying means 7002, the cell-layout inferring means 1203d infers a cell layout from the detected marker and stores the cell layout inferred thereby in a memory (not shown in the figure) or the like. It is to be noted that the method adopted by the cell-layout inferring means 1203d to infer a cell layout from a detected marker is the same as the method adopted by the cell-layout inferring means 1203 in the first exemplary embodiment to infer a cell layout. For example, if the identified code is a QR code, let the cell-layout inferring means 1203d infer a cell layout in the QR code by adoption of the same method as the first exemplary embodiment.

The pixel-value restricting means 1207d is driven to store a pixel-value restricting function determined in accordance with the type of a code identified by the code identifying means 7002 in a memory (not shown in the figure) or the like. It is to be noted that the method adopted by the pixel-value restricting means 1207d to store a pixel-value restricting function in the memory (not shown in the figure) or the like is the same as the method adopted by the pixel-value restricting means 1207 in the first exemplary embodiment to store a pixel-value restricting function in a memory (not shown in the figure) or the like. For example, if the identified code is a QR code, let the pixel-value restricting means 1207d store a pixel-value restricting function in the memory (not shown in the figure) or the like by adoption of the same method as the first exemplary embodiment.

On the basis of an inferred cell layout, the optimized-area specifying means 1208d specifies an area to be recovered by making use of an objective function determined by the objective-function determining means 1209. It is to be noted that a method adopted by the optimized-area specifying means 1208d to specify an area is the same as the method adopted by the optimized-area specifying means 1208 in the first exemplary embodiment to specify an area.

The blur-removal determining means 7003 determines whether or not a code with blurs remaining to be removed exists in an image. In general, a blurred area in an image is characterized in that the area has few high-frequency components in comparison with other areas. So, the blur-removal determining means 7003 may apply a high-pass filter to an image so as to treat an area having few high-frequency components as a blurring area in order to detect blurs in an attempt to determine whether or not a code with blurs remaining to be removed exists. However, the method adopted by the blur-removal determining means 7003 to detect a blur is by no means limited to this method of applying a high-pass filter.

If a code with blurs remaining to be removed still exists in an image, the code identifying means 7002 again carries out identification processing on the code. Then, the code identifying means 7002 requests the marker-area blur removing means 1202d to remove the blurs from the code. If a code with blurs remaining to be removed does not exist anymore in an image, the blur-removal determining means 7003 stores the image in a memory (not shown in the figure) or the like.

It is to be noted that the plural-marker detecting means 7001, the code identifying means 7002, the marker-area blur removing means 1202d and the blur-removal determining means 7003 are implemented by typically the CPU of a computer which operates in accordance with an executed program (that is, an image processing program). In actuality, the marker-area blur removing means 1202d has the cell-layout inferring means 1203d, the blur-function determining means 1204, the geometrical-deformation inferring means 1205, the error-function determining means 1206, the pixel-value restricting means 1207d, the optimized-area specifying means 1208d, the objective-function determining means 1209, the objective-function optimizing means 1210 and the pixel-value discretizing means 1211 as described above.

Figure 10:
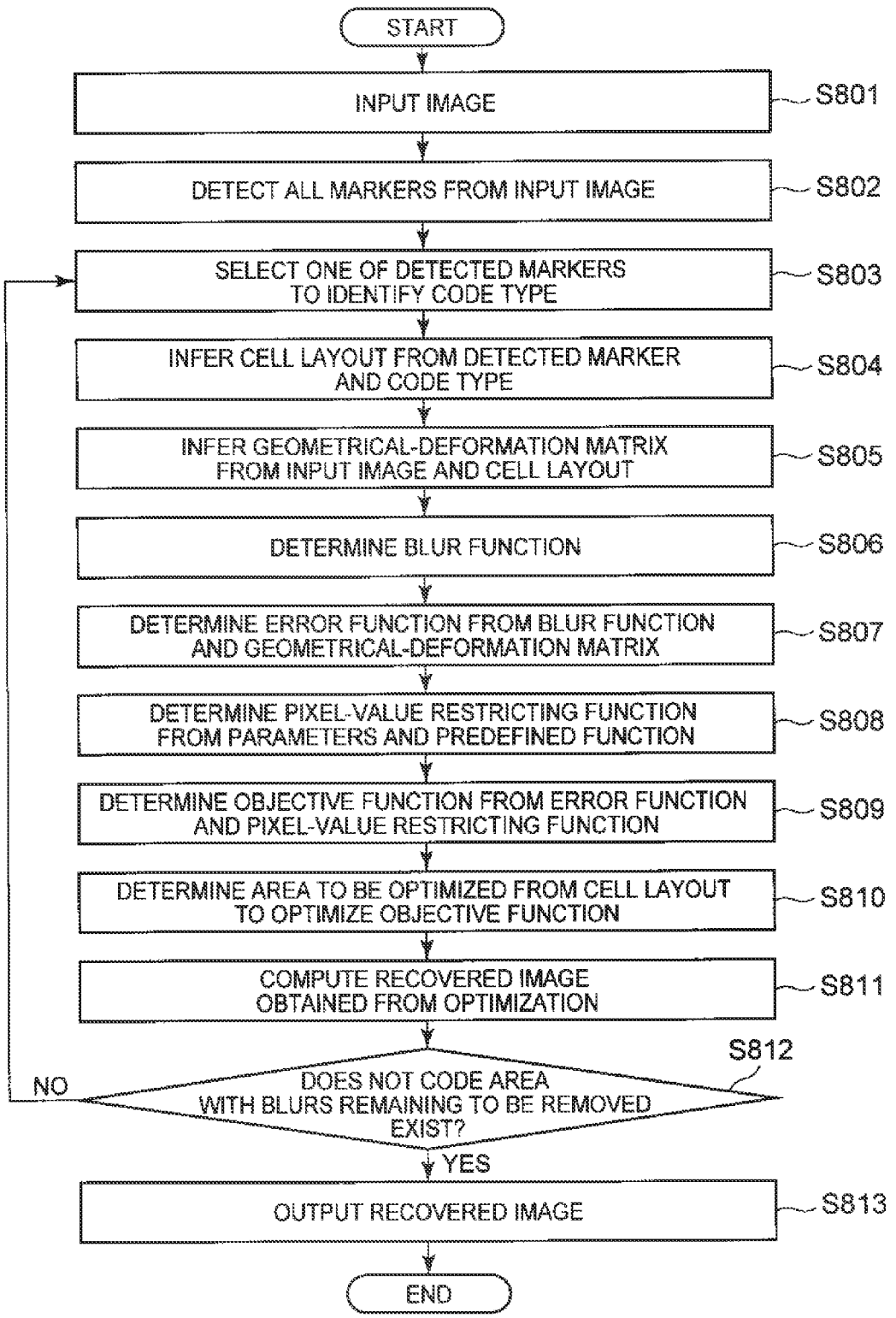
FIG. 10 It depicts a flowchart showing an example of operations carried out by the image processing system according to the fourth exemplary embodiment.

Next, operations carried out by the image processing system according to this exemplary embodiment are explained as follows. FIG. 10 is a flowchart showing examples of the operations carried out by the image processing system according to the fourth exemplary embodiment. First of all, at a step S801, an input image is supplied to the image inputting means 1100 which then stores the input image in a memory shown in none of the figures.

Then, at the next step S802, the plural-marker detecting means 7001 detects all markers from the input image stored by the image inputting means 1100 in the memory shown in none of the figures. Then, at the next step S803, the code identifying means 7002 selects a marker from the markers detected by the plural-marker detecting means 7001 and identifies the type of the code of the selected marker. Then, at the next step S804, the cell-layout inferring means 1203d infers a cell layout from the identified code type and the selected marker.

Then, at the next step S805, the geometrical-deformation inferring means 1205 infers a geometrical-deformation matrix W from the input image and the cell layout. Then, at the next step S806, the blur-function determining means 1204 determines a blur function B. Then, at the next step S807, the error-function determining means 1206 determines an error function from the inferred geometrical-deformation matrix W and the determined blur function B, storing the error function in a memory shown in none of the figures.

Then, at the next step S808, the pixel-value restricting means 1207d receives parameters supplied by the user on the basis of the cell layout stored by the cell-layout inferring means 1203d in a memory shown in none of the figures as parameters used for representing a pixel-value restricting function. Then, at the same step, the pixel-value restricting means 1207d determines the pixel-value restricting function on the basis of the parameters and a function defined in advance, storing the pixel-value restricting function determined thereby in a memory shown in none of the figures.

Then, at the next step S809, the objective-function determining means 1209 determines an objective function from the error function and the pixel-value restricting function, storing the objective function determined thereby in a memory shown in none of the figures. As described above, the error function has been stored by the error-function determining means 1206 in a memory shown in none of the figures whereas the pixel-value restricting function has been stored by the pixel-value restricting means 1207d in a memory shown in none of the figures.

Then, at the next step S810, when the optimized-area specifying means 1208d specifies an area for which the objective function is to be optimized from the cell layout inferred by the cell-layout inferring means 1203d, the objective-function optimizing means 1210 optimizes the objective function for the area. Then, at the next step S811, the pixel-value discretizing means 1211 discretizes pixel values for a result obtained by optimization of the objective function in order to convert the code area into a multi-value area.

Then, at the next step S812, the blur-removal determining means 7003 determines whether or not a code area with blurs remaining to be removed does not exist in the recovered image. If the determination result produced at the step S812 is NO indicating that a code area with blurs remaining to be removed exists in the recovered image, the flow of the processing goes back to the step S803. If the determination result produced at the step S812 is YES indicating that a code area with blurs remaining to be removed does not exist in the recovered image, on the other hand, the flow of the processing goes on to a step S813. At the step S813, the image outputting means 1300 outputs the computed recovered image in accordance with a request made by the blur-removal determining means 7003.

The processing described so far is summarized as follows. At the step S803, a marker of a certain type is selected from a plurality of markers detected by the code identifying means 7002. Then, at the steps S803 to S811, the marker-area blur removing means 1202d removes blurs from a code corresponding to the selected marker. Then, at the step S812, the blur-removal determining means 7003 determines whether or not a code having a type with blurs remaining to be removed exists in the image. To put it concretely, if a marker corresponding to a QR code is selected at the step S803, at the steps S804 to S811, the marker-area blur removing means 1202d removes blurs from a plurality of QR codes. Then, at the step S812, the blur-removal determining means 7003 determines whether or not a code having another type with blurs remaining to be removed exists in the image. That is to say, the operation carried out at the step S812 to determine whether or not a code area with blurs remaining to be removed exists in the recovered image can also be said to be an operation carried out to determine whether or not a code having another type with blurs remaining to be removed exists in the recovered image.

As described above, in addition to the operations carried out in the first exemplary embodiment, the plural-marker detecting means 7001 detects a plurality of markers included in the image as markers with different types whereas the code identifying means 7002 identifies the types of codes corresponding to the detected markers. Then, the blur-removal determining means 7003 determines whether or not a code with blurs remaining to be removed exists in the image.

That is to say, in this exemplary embodiment, the plural-marker detecting means 7001, the code identifying means 7002 and the blur-removal determining means 7003 detect a plurality of codes in the input image and remove blurs from the codes. Thus, even if a plurality of codes with different types exist in the input image, blurs of all the codes can be removed.

Example

The following description explains the present invention by describing a concrete example. However, the scope of the present invention is by no means limited to this example. This example corresponds to the first exemplary embodiment. The example is explained by referring to FIG. 1 as follows.

In the example, the image inputting means 1100 is implemented by a video capture board capable of inputting and outputting NTSC (National Television System Committee) signals whereas the image outputting means 1300 is implemented by a display apparatus. In addition, the computer 1200 is implemented by an image processing board having an image processing processor. The video capture board converts an input video signal into a YUV signal and transmits the YUV signal to the image processing board. In addition, the result of processing carried out by the image processing board is transferred to the video capture board. The video capture board converts the result of the processing into a video signal and displays the video signal on the display apparatus. In this way, in this example, the result of processing carried out by the image processing board is transferred to the video capture board and the video capture board displays an image on the display apparatus.

The image processing board includes the marker detecting means 1201 and the marker-area blur removing means 1202. When the signal of an input image is supplied to the image inputting means 1100, the image inputting means 1100 stores the value of the input signal in a memory or the like. The marker detecting means 1201 detects a marker existing in the input image. If the code serving as an object of blur elimination is a QR code, the marker detecting means 1201 searches for markers such as the markers F1021 to F1023 shown in FIG. 2 by adoption of the template matching technique. Then, the marker detecting means 1201 stores the coordinates of the center of each detected marker and the input image in a memory or the like.

Figure 11:
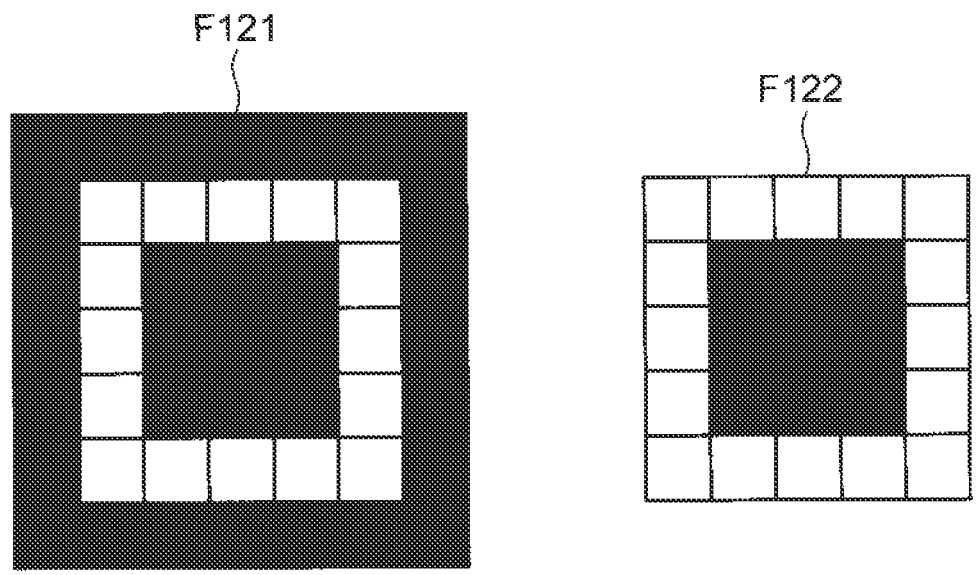
FIG. 11 It depicts an explanatory diagram showing a marker in a QR code.

The cell-layout inferring means 1203 computes the number of cells of a code from a marker detected by the marker detecting means 1201. By referring to FIG. 11, the following description explains a method for inferring the number of cells. FIG. 11 is an explanatory diagram showing a marker F121 in a QR code. The size of the marker F121 in a QR code is 7×7 cells. The marker F121 includes a white frame F122 having a size of 5×5 cells.

If the marker detected by the marker detecting means 1201 is a marker of a QR code, first of all, the cell-layout inferring means 1203 infers the number of pixels per cell from the size of the frame of white cells. Then, the cell-layout inferring means 1203 computes the number of pixels composing the entire code from the coordinates of each of markers placed at 3 locations of the code. Subsequently, the cell-layout inferring means 1203 computes the number of cells composing the code of interest on the basis of this information. Finally, the cell-layout inferring means 1203 stores the inferred cell count representing the number of cells, the input image and the coordinates of the center of each marker in a memory.

The blur-function determining means 1204 determines a blur function which is a PSF (Point Spread Function) representing the degree of blurring of a detected marker area. The blur function can be a function determined in advance by the user or a function inferred from information generated by typically an acceleration sensor. In the following description, the blur function is denoted by reference symbol B in the same way as the first exemplary embodiment. In addition, the blur function B is assumed to be an N×N matrix. On top of that, reference symbol Z denotes a vertical vector laid in the raster scan order to represent luminance values of pixels in an image having a pixel count of N. In addition, reference symbol $Z_b$ denotes a vertical vector laid in the raster scan order to represent luminance values of pixels in an image Z blurred by a given blur function B. In this case, a relation between the vertical vector Z and the vertical vector $Z_b$ can be represented by Eq. 1 given earlier as an equation making use of the blur function B.

The geometrical-deformation inferring means 1205 infers a geometrical-deformation matrix W from the coordinates of the center of each marker. These coordinates have been stored by the cell-layout inferring means 1203 in a memory. Reference symbol $Z_N$ denotes a vertical vector whose components are the luminance values of pixels composing an input image having a pixel count of N. On the other hand, reference symbol $Z_M$ denotes a vertical vector whose components are the luminance values of pixels composing a recovered image deformed by a geometrical-deformation matrix W into a recovered image having a pixel count of M. In this case, a relation between the vertical vector $Z_N$ and the vertical vector $Z_M$ can be represented by Eq. 2 given earlier as an equation making use of the geometrical-deformation matrix W.

The geometrical-deformation inferring means 1205 computes parameters of a deformation model assumed in advance from corresponding points between the coordinates of the center of each marker detected from the input image and the coordinates of the center of each marker in the recovered image. In this way, let the geometrical-deformation inferring means 1205 infer a geometrical-deformation matrix W. It is to be noted that examples of the deformation model include an affine deformation model.

The error-function determining means 1206 determines error function $E_{data}$ (X) representing a relation between the luminance component Y of the input image and the luminance component X of the recovered image by making use of a blur function B determined by the blur-function determining means 1204 and a geometrical-deformation matrix W inferred by the geometrical-deformation inferring means 1205. Then, the error-function determining means 1206 stores the error function $E_{data}$ (X) determined thereby in a memory. The error function $E_{data}$ (X) is a function including the luminance component Y, the luminance component X, the geometrical-deformation matrix W and the blur function B. The more correct the luminance component X of the recovered image, the smaller the value of the error function $E_{data}$ (X). The error function $E_{data}$ (X) is defined in advance as a relation equation like one expressed by Eq. 17 given as follows.

$$E_{data}(X)=|B\cdot W\cdot X-Y|^2 \quad \text{(Eq. 17)}$$

The pixel-value restricting means 1207 determines a pixel-value restricting function $E_{reg}$ (X) for restricting an operation to configure a code from a small number of discretized pixel values and stores the pixel-value restricting function $E_{reg}$ (X) determined thereby in a memory. If the 2-dimensional code is configured from 2 pixel values as is the case with the QR code, the pixel-value restricting function $E_{reg}$ (X) is defined in advance as a relation equation like one expressed by Eq. 18 given as follows.

$$E_{reg}(X)=\|(X-X_1)\otimes(X-X_2)\otimes(X-X_1)\otimes(X-X_2)\| \quad \text{(Eq. 18)}$$

In this case, the symbol given below represents multiplication for each element of a vector. Reference notations $X_1$ and $X_2$ denote respectively 2 pixel values composing a code. It is to be noted that the definition of the pixel-value restricting function $E_{reg}$ (X) is by no means limited to Eq. 18 given above. That is to say, the pixel-value restricting function $E_{reg}$ (X) can be defined by any other equation as long as the other function is a function having a minimum value at $X_1$ and $X_2$. An example of such a function is a function called a double-well potential. $\otimes$ The objective-function determining means 1209 determines an objective function E (x) by making use of the error function $E_{data}$ (X) determined by the error-function determining means 1206 and the pixel-value restricting function $E_{reg}$ (X) determined by the pixel-value restricting means 1207. Then, the objective-function determining means 1209 stores the objective function E (x) determined thereby in a memory. The objective function E (X) is defined in advance as a relation equation like one expressed by Eq. 9 given earlier.

The optimized-area specifying means 1208 specifies a pixel, which needs to be inferred by making use of the objective function E (X), among luminance components X of the recovered image from the cell layout determined by the cell-layout inferring means 1203. In this example, an operation to specify a pixel which needs to be inferred implies an operation to specify an area of the recovered image. An area to be optimized is typically specified by the user.

The objective-function optimizing means 1210 computes X that minimizes the objective function E (X). That is to say, the objective-function optimizing means 1210 computes X that optimizes the objective function E (X). To put it concretely, the objective-function optimizing means 1210 computes $X_0$ that satisfies Eq. 11 given earlier. Examples of the method adopted by the objective-function optimizing means 1210 to optimize the objective function E (X) include the gradient method, the Newton method and the conjugate gradient method.

By making use of a threshold value given in advance by the user, the pixel-value discretizing means 1211 discretizes the pixel values of $X_0$ computed by the objective-function optimizing means 1210. By converting $X_0$ into a binary image, the luminance values included in a code in the recovered image as the luminance values of all pixels in an area of the code are converted into $X_1$ or $X_2$.

In this example, the error function and the pixel-value restricting function are determined by making use of the luminance value only. It is to be noted, however, that if the error function and the pixel-value restricting function are represented by making use of RGB values for example, it is possible to make use of Eqs. 19 and 20 given below to define the error function and the pixel-value restricting function in place of Eqs. 17 and 3 respectively.

$$E_{data}(X_R, X_G, X_B) = \quad \text{(Eq. 19)}$$
$$|B\cdot W\cdot X_R - Y_R|^2 + |B\cdot W\cdot X_G - Y_G|^2 + |B\cdot W\cdot X_B - Y_B|^2$$

$$E_{data}(X_R, X_G, X_B) = \left\|\prod_{k=1}^{i}(X_R-X_{Rk})\otimes(X_R-X_{Rk})+ \quad \text{(Eq. 20)}\right.$$
$$\left.(X_G-X_{Gk})\otimes(X_G-X_{Gk})+(X_B-X_{Bk})\otimes(X_B-X_{Bk})\right\|$$

In Eq. 20, symbol $\Pi$ represents an operation to find a total product for vector elements ranging from k=1 to k=i. In addition, $X_{Rk}$, $X_{Gk}$ and $X_{Bk}$ are RGB values restricting the kth code.

Figure 12:
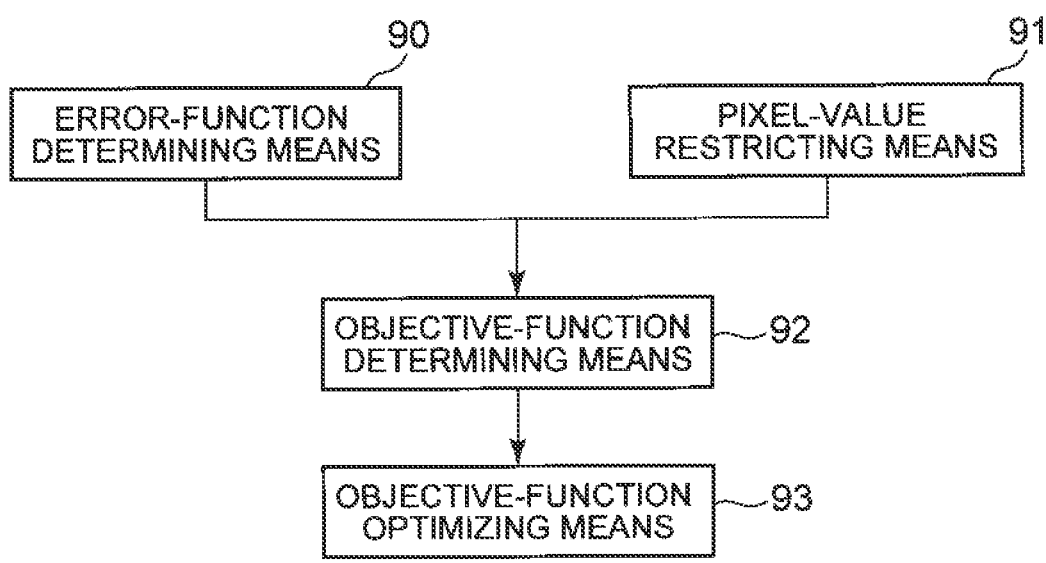
FIG. 12 It depicts a block diagram showing an example of a minimum configuration of the image processing system provided by the present invention.
Figure 13:
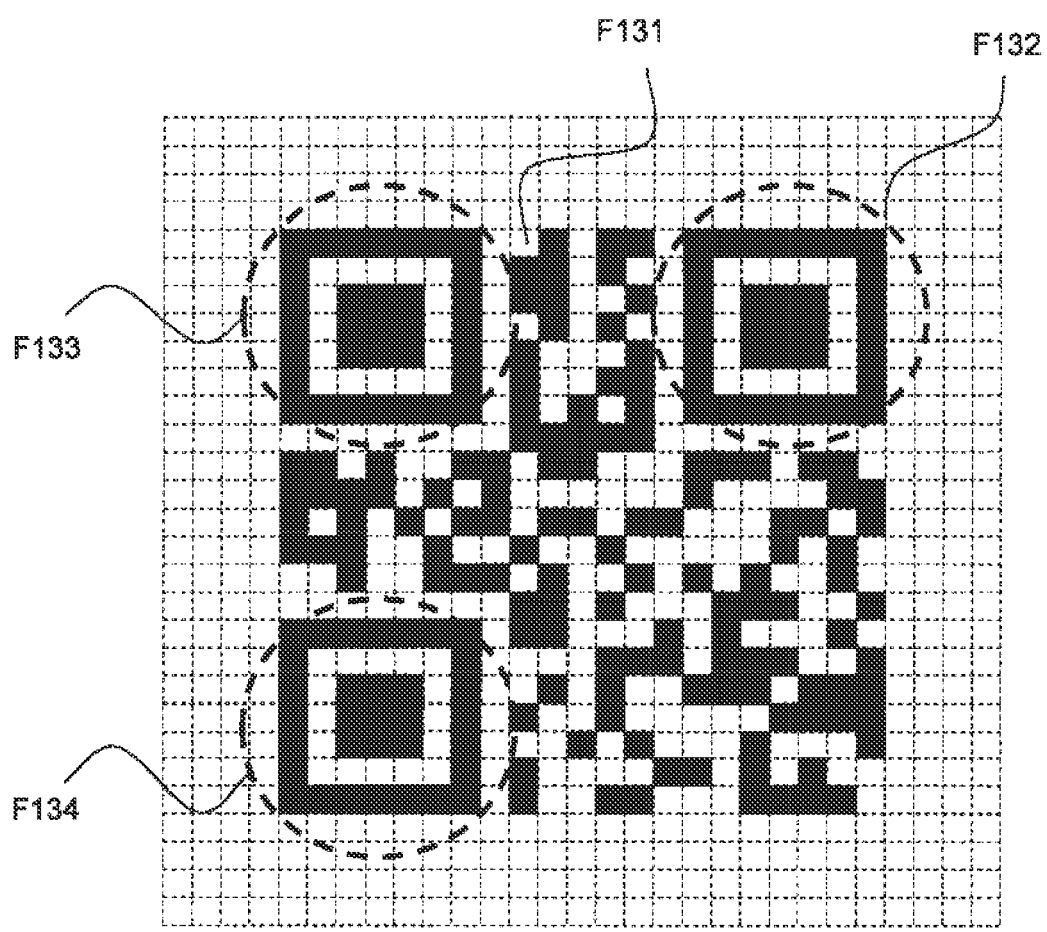
FIG. 13 It depicts an explanatory diagram showing a QR code.

Next, the following description explains an exemplary minimum configuration of the image processing system according to the present invention. FIG. 12 is a block diagram showing an example of a minimum configuration of the image processing system provided by the present invention. The image processing system provided by the present invention includes error-function determining means 90 such as the error-function determining means 1206, pixel-value restricting means 91 such as the pixel-value restricting means 1207, objective-function determining means 92 such as the objective-function determining means 1209 and objective-function optimizing means 93 such as the objective-function optimizing means 1210.

The error-function determining means 90 determines an error function such as the $E_{data}$ by making use of a blur function such as the blur function B and a geometrical-deformation matrix such as the geometrical-deformation matrix W. The blur function is a function representing the degree of blurring of a blurred input image. On the other hand, the geometrical-deformation matrix is a matrix for restricting an operation to lay out a 2-dimensional code shown by the input image on cells which are each the configuration unit of the 2-dimensional code. The error function is a function satisfying a relation that, the smaller the error between the input image and an image obtained by adding geometrical deformations and blurs to a recovered image (such as the recovered image X) which is an image obtained from a recovering process, the more the approach to a result determined in advance. For example, the smaller the error described above, the smaller the value of the error function.

The pixel-value restricting means 91 determines pixel-value restriction information prescribing a restriction condition for a restriction imposed on a predetermined pixel value obtained from discretization of pixel values of the 2-dimensional code to be recovered. For example, the pixel-value restricting means 91 defines a pixel-value restricting function $E_{reg}$ (X) setting a restriction condition requiring that the pixel values of the recovered image be a small number of discretized values.

The objective-function determining means 92 makes use of the error function and the pixel-value restriction information as a basis for determining an objective function serving as a function satisfying a relation that, the closer the recovered image to the true image, the more the approach to a result determined in advance. An example of the objective function is the objective function E (X).

The objective-function optimizing means 93 determines a recovered image which optimizes the objective function.

With such a configuration, an accurate recovered image can be obtained from a much blurred code image. That is to say, by adopting such a configuration and by making use of an objective function configured on the basis of a plurality of restrictions regarding the code image, a solution to a defect setting problem can be stabilized on the basis of the restrictions. Therefore, even in the case of a much blurred code image, a more accurate recovered image can be obtained.

Some parts of the exemplary embodiments described above or all parts of the exemplary embodiments are described below as supplementary notes even though the scope of the present invention is by no means limited to the supplementary notes.

Supplementary Note 1:

An image processing system characterized by including:

error-function determining means for making use of a blur function serving as a function representing the degree of blurring of a blurred input image and a geometrical-deformation matrix serving as a matrix for restricting an operation to lay out a 2-dimensional code shown by the input image on cells each serving as a configuration unit of the 2-dimensional code in order to determine an error function serving as a function satisfying a relation that, the smaller the error between the input image and an image obtained by adding geometrical deformations and blurs to a recovered image obtained from a recovering process, the more the approach to a result determined in advance;

pixel-value restricting means for determining pixel-value restriction information prescribing a restriction condition for a restriction imposed on a predetermined pixel value obtained from discretization of pixel values of the 2-dimensional code to be recovered;

objective-function determining means for making use of the error function and the pixel-value restriction information as a basis for determining an objective function serving as a function satisfying a relation that, the closer the recovered image to the true image, the more the approach to a result determined in advance; and objective-function optimizing means for determining a recovered image which optimizes the objective function.

Supplementary Note 2:

The image processing system according to supplementary note 1 wherein:

the error-function determining means determines an error function having an error-function value varying in such a way that, the smaller the error between the input image and an image obtained by adding geometrical deformations and blurs to the recovered image, the smaller the error-function value;

as a restriction condition, the pixel-value restricting means determines pixel-value restriction information taking a pixel-value restricting function serving as a function showing that, the closer the pixel values of pixels included in an image to any one of discretized pixel values, the more appropriate the image;

on the basis of the error function and the pixel-value restriction information, the objective-function determining means determines an objective function having an objective-function value varying in such a way that, the closer the recovered image to the true image, the smaller the objective-function value; and the objective-function optimizing means determines a recovered image which minimizes the objective function.

Supplementary Note 3:

The image processing system according to supplementary note 1 wherein:

the error-function determining means determines an error function having an error-function value varying in such a way that, the smaller the error between the input image and an image obtained by adding geometrical deformations and blurs to the recovered image, the smaller the error-function value;

as pixel-value restriction information, the pixel-value restricting means determines a restriction condition requiring that pixel values possible for the recovered image be discrete values the number of which is determined in advance;

the objective-function determining means determines an objective function having objective-function values which are any ones of the discrete values determined as a restriction condition of the pixel-value restriction information; and the objective-function optimizing means determines a recovered image which minimizes the objective function.

Supplementary Note 4:

The image processing system according to any one of supplementary notes 1 to 3, the system further having pixel-value discretizing means for discretizing pixel values of a recovered image determined by the objective-function optimizing means by making use of a threshold value determined in advance in order to generate a recovered image.

Supplementary Note 5:

The image processing system according to any one of supplementary notes 1 to 4, the system further having:

marker detecting means for detecting markers of a 2-dimensional code;

cell-layout inferring means for inferring a cell layout of the 2-dimensional code from the markers detected by the marker detecting means;

blur-function determining means for determining a blur function for an input image;

geometrical-deformation inferring means for inferring a geometrical-deformation matrix from the inferred cell layout of the 2-dimensional code; and optimized-area specifying means for specifying an area of the input image to be recovered, wherein the error-function determining means determines an error function on the basis of the input image, the blur function determined by the blur-function determining means and the geometrical-deformation matrix inferred by the geometrical-deformation inferring means.

Supplementary Note 6:

The image processing system according to any one of supplementary notes 1 to 5, the system further having simultaneously-optimized-variable specifying means for specifying elements among elements composing the objective function as variables to be simultaneously optimized by the objective-function optimizing means wherein the objective-function optimizing means determines a recovered image optimizing the objective function and determines the elements specified by the simultaneously-optimized-variable specifying means.

Supplementary Note 7:

The image processing system according to any one of supplementary notes 1 to 4, the system further having:

cell-layout inputting means for receiving a cell layout of a 2-dimensional code;

geometrical-deformation inputting means for receiving a geometrical-deformation matrix; and blur-function inputting means for receiving a blur function, wherein:

the error-function determining means determines an error function by making use of the geometrical-deformation matrix received by the geometrical-deformation inputting means and the blur function received by the blur-function inputting means; and the pixel-value restricting means determines pixel-value restriction information on the basis of a cell layout received by the cell-layout inputting means as the cell layout of a 2-dimensional code.

Supplementary Note 8:

The image processing system according to any one of supplementary notes 5 to 7, the system further having:

plural-marker detecting means for detecting all markers existing in an image as markers having a plurality of types;

code-type identifying means for identifying the type of a code of each detected marker; and blur-removal determining means for determining whether or not blur removal has been carried out for all codes in a recovered image determined by the objective-function optimizing means, wherein the cell-layout inferring means infers a cell layout of a 2-dimensional code from markers detected by the plural-marker detecting means.

Supplementary Note 9:

An image processing method characterized in that the method is carried out by:

determining an error function by making use of a blur function serving as a function representing the degree of blurring of a blurred input image and a geometrical-deformation matrix serving as a matrix for restricting an operation to lay out a 2-dimensional code shown by the input image on cells each serving as a configuration unit of the 2-dimensional code wherein the error function is a function satisfying a relation that, the smaller the error between the input image and an image obtained by adding geometrical deformations and blurs to a recovered image obtained from a recovering process, the more the approach to a result determined in advance;

determining pixel-value restriction information prescribing a restriction condition for a restriction imposed on a predetermined pixel value obtained from discretization of pixel values of the 2-dimensional code to be recovered;

determining an objective function on the basis of the error function and the pixel-value restriction information wherein the objective function is a function satisfying a relation that, the closer the recovered image to the true image, the more the approach to a result determined in advance; and determining a recovered image which optimizes the objective function.

Supplementary Note 10:

The image processing method according to supplementary note 9, the method carried out by:

determining an error function having an error-function value varying in such a way that, the smaller the error between the input image and an image obtained by adding geometrical deformations and blurs to the recovered image, the smaller the error-function value;

determining pixel-value restriction information taking a pixel-value restricting function as a restriction condition wherein the pixel-value restricting function is a function showing that, the closer the pixel values of pixels included in an image to any one of discretized pixel values, the more appropriate the image;

determining an objective function on the basis of the error function and the pixel-value restriction information wherein the objective function is a function having an objective-function value varying in such a way that, the closer the recovered image to the true image, the smaller the objective-function value; and determining a recovered image which minimizes the objective function.

Supplementary Note 11:

The image processing method according to supplementary note 9, the method carried out by:

determining an error function having an error-function value varying in such a way that, the smaller the error between the input image and an image obtained by adding geometrical deformations and blurs to the recovered image, the smaller the error-function value;

determining a restriction condition as pixel-value restriction information wherein the restriction condition is a condition requiring that pixel values possible for the recovered image be discrete values the number of which is determined in advance;

determining an objective function having objective-function values which are any ones of the discrete values determined by taking pixel values possible for the recovered image in the error function as a restriction condition of the pixel-value restriction information; and determining a recovered image which minimizes the objective function.

Supplementary Note 12:

An image processing program to be executed by a computer to carry out:

error-function determination processing to make use of a blur function serving as a function representing the degree of blurring of a blurred input image and a geometrical-deformation matrix serving as a matrix for restricting an operation to lay out a 2-dimensional code shown by the input image on cells each serving as a configuration unit of the 2-dimensional code in order to determine an error function serving as a function satisfying a relation that, the smaller the error between the input image and an image obtained by adding geometrical deformations and blurs to a recovered image obtained from a recovering process, the more the approach to a result determined in advance;

pixel-value restriction processing to determine pixel-value restriction information prescribing a restriction condition for a restriction imposed on a predetermined pixel value obtained from discretization of pixel values of the 2-dimensional code to be recovered;

objective-function determination processing to make use of the error function and the pixel-value restriction information as a basis for determining an objective function serving as a function satisfying a relation that, the closer the recovered image to the true image, the more the approach to a result determined in advance; and objective-function optimization processing to determine a recovered image which optimizes the objective function.

Supplementary Note 13:

The image processing program according to supplementary note 12, the program being a program to be executed by a computer so that:

the error-function determination processing is carried out in order to determine an error function having an error-function value varying in such a way that, the smaller the error between the input image and an image obtained by adding geometrical deformations and blurs to the recovered image, the smaller the error-function value;

the pixel-value restriction processing is carried out in order to determine pixel-value restriction information taking a pixel-value restricting function as a restriction condition wherein the pixel-value restricting function is a function showing that, the closer the pixel values of pixels included in an image to any one of discretized pixel values, the more appropriate the image;

the objective-function determination processing is carried out on the basis of the error function and the pixel-value restriction information in order to determine an objective function having an objective-function value varying in such a way that, the closer the recovered image to the true image, the smaller the objective-function value; and the objective-function optimization processing is carried out in order to determine a recovered image which minimizes the objective function.

Supplementary Note 14:

The image processing program according to supplementary note 12, the program being a program to be executed by a computer so that:

the error-function determination processing is carried out in order to determine an error function having an error-function value varying in such a way that, the smaller the error between the input image and an image obtained by adding geometrical deformations and blurs to the recovered image, the smaller the error-function value;

the pixel-value restriction processing is carried out in order to determine a restriction condition as pixel-value restriction information wherein the restriction condition is a condition requiring that pixel values possible for the recovered image be discrete values the number of which is determined in advance;

the objective-function determination processing is carried out in order to determine an objective function having objective-function values which are any ones of the discrete values determined by taking pixel values possible for the recovered image in the error function as a restriction condition of the pixel-value restriction information; and the objective-function optimization processing is carried out in order to determine a recovered image which minimizes the objective function.

The present invention has been described so far by explaining exemplary embodiments and an example. However, the scope of the present invention is by no means limited to the exemplary embodiments and the example. A person skilled in the art is capable of making a variety of changes to configurations of the present invention and details of the invention in the scope of the invention.

This application claims a priority right based on JP-A-2010-193745 submitted on Aug. 31, 2010 and includes its all disclosures therein.

INDUSTRIAL APPLICABILITY

The present invention is properly applied to an image processing system capable of recovering an area of an image, in which a 2-dimensional code is included, with a high degree of precision.

REFERENCE SIGNS LIST

1100 . . . Image inputting means
1200, 1200a, 1200b and 1200d . . . Computer
1201 . . . Marker detecting means
1202, 1202a, 1202b and 1202d . . . Marker-area blur removing means
1203 and 1203d . . . Cell-layout inferring means
1204 . . . Blur-function determining means
1205 . . . Geometrical-deformation inferring means
1206 and 1206b . . . Error-function determining means
1207, 1207b and 1207d . . . Pixel-value restricting means
1208, 1208b and 1208d . . . Optimized-area specifying means
1209 and 1209a . . . Objective-function determining means
1210 . . . Objective-function optimizing means
1211 . . . Pixel-value discretizing means
1300 . . . Image outputting means
3001 . . . Simultaneously optimized variable specifying means
3002 . . . Objective-function simultaneously optimizing means
5001 . . . Cell-layout inputting means
5002 . . . Geometrical-deformation inputting means
5003 . . . Blur-function inputting means
7001 . . . Plural-marker detecting means
7002 . . . Code identifying means
7003 . . . Blur-removal determining means
90 . . . Error-function determining means
91 . . . Pixel-value restricting means
92 . . . Objective-function determining means
93 . . . Objective-function optimizing means

The invention claimed is:

1. An image processing system characterized by comprising:

a hardware including a processor;

an error-function determining unit, implemented by the processor, for making use of a blur function serving as a function representing the degree of blurring of a blurred input image and a geometrical-deformation matrix serving as a matrix for restricting an operation to lay out a 2-dimensional code shown by the input image on cells each serving as a configuration unit, implemented by the processor, of the 2-dimensional code in order to determine an error function serving as a function satisfying a relation that, the smaller the error between the input image and an image obtained by adding geometrical deformations and blurs to a recovered image obtained from a recovering process, the more the approach to a result determined in advance;

a pixel-value restricting unit, implemented by the processor, for determining pixel-value restriction information prescribing a restriction condition for a restriction imposed on a predetermined pixel value obtained from discretization of pixel values of the 2-dimensional code to be recovered;

an objective-function determining unit, implemented by the processor, for making use of the error function and the pixel-value restriction information as a basis for determining an objective function serving as a function satisfying a relation that, the closer the recovered image to the true image, the more the approach to a result determined in advance; and an objective-function optimizing unit, implemented by the processor, for determining a recovered image which optimizes the objective function.

2. The image processing system according to claim 1 wherein:

the error-function determining unit determines an error function having an error-function value varying in such a way that, the smaller the error between the input image and an image obtained by adding geometrical deformations and blurs to the recovered image, the smaller the error-function value;

as a restriction condition, the pixel-value restricting unit, implemented by the processor, determines pixel-value restriction information taking a pixel-value restricting function serving as a function showing that, the closer the pixel values of pixels included in an image to any one of discretized pixel values, the more appropriate the image;

on the basis of the error function and the pixel-value restriction information, the objective-function determining unit, implemented by the processor, determines an objective function having an objective-function value varying in such a way that, the closer the recovered image to the true image, the smaller the objective-function value; and the objective-function optimizing unit determines a recovered image which minimizes the objective function.

3. The image processing system according to claim 1 wherein:

the error-function determining unit determines an error function having an error-function value varying in such a way that, the smaller the error between the input image and an image obtained by adding geometrical deformations and blurs to the recovered image, the smaller the error-function value;

as pixel-value restriction information, the pixel-value restricting unit determines a restriction condition requiring that pixel values possible for the recovered image be discrete values the number of which is determined in advance;

the objective-function determining unit determines an objective function having objective-function values which are any ones of the discrete values determined as a restriction condition of the pixel-value restriction information; and the objective-function optimizing unit determines a recovered image which minimizes the objective function.

4. The image processing system according to claim 1, the system further having a pixel-value discretizing unit, implemented by the processor, for discretizing pixel values of a recovered image determined by the objective-function optimizing unit by making use of a threshold value determined in advance in order to generate a recovered image.

5. The image processing system according to claim 1, the system further having:

a marker detecting unit, implemented by the processor, for detecting markers of a 2-dimensional code;

a cell-layout inferring unit, implemented by the processor, for inferring a cell layout of the 2-dimensional code from the markers detected by the marker detecting unit;

a blur-function determining unit, implemented by the processor, for determining a blur function for an input image;

a geometrical-deformation inferring unit, implemented by the processor, for inferring a geometrical-deformation matrix from the inferred cell layout of the 2-dimensional code; and an optimized-area specifying unit, implemented by the processor, for specifying an area of the input image to be recovered, wherein the error-function determining unit determines an error function on the basis of the input image, the blur function determined by the blur-function determining unit and the geometrical-deformation matrix inferred by the geometrical-deformation inferring unit.

6. The image processing system according to claim 5, the system further having:

a plural-marker detecting unit, implemented by the processor, for detecting all markers existing in an image as markers having a plurality of types;

a code-type identifying unit, implemented by the processor, for identifying the type of a code of each detected marker; and a blur-removal determining unit, implemented by the processor, for determining whether or not blur removal has been carried out for all codes in a recovered image determined by the objective-function optimizing unit, wherein the cell-layout inferring unit infers a cell layout of a 2-dimensional code from markers detected by the plural-marker detecting unit.

7. The image processing system according to claim 1, the system further having a simultaneously-optimized-variable specifying unit, implemented by the processor, for specifying elements among elements composing the objective function as variables to be simultaneously optimized by the objective-function optimizing unit, wherein the objective-function optimizing unit determines a recovered image optimizing the objective function and determines the elements specified by the simultaneously-optimized-variable specifying unit.

8. The image processing system according to claim 1, the system further having:

a cell-layout inputting unit, implemented by the processor, for receiving a cell layout of a 2-dimensional code;

a geometrical-deformation inputting unit, implemented by the processor, for receiving a geometrical-deformation matrix; and a blur-function inputting unit, implemented by the processor, for receiving a blur function, wherein:

the error-function determining unit determines an error function by making use of the geometrical-deformation matrix received by the geometrical-deformation inputting unit and the blur function received by the blur-function inputting unit; and the pixel-value restricting unit determines pixel-value restriction information on the basis of a cell layout received by the cell-layout inputting unit as the cell layout of a 2-dimensional code.

9. An image processing method characterized in that the method is carried out by:

determining an error function by making use of a blur function serving as a function representing the degree of blurring of a blurred input image and a geometrical-deformation matrix serving as a matrix for restricting an operation to lay out a 2-dimensional code shown by the input image on cells each serving as a configuration unit of the 2-dimensional code wherein the error function is a function satisfying a relation that, the smaller the error between the input image and an image obtained by adding geometrical deformations and blurs to a recovered image obtained from a recovering process, the more the approach to a result determined in advance;

determining pixel-value restriction information prescribing a restriction condition for a restriction imposed on a predetermined pixel value obtained from discretization of pixel values of the 2-dimensional code to be recovered;

determining an objective function on the basis of the error function and the pixel-value restriction information wherein the objective function is a function satisfying a relation that, the closer the recovered image to the true image, the more the approach to a result determined in advance; and determining a recovered image which optimizes the objective function.

10. A non-transitory computer readable information recording medium storing an image processing program that, when executed by a processor, performs a method for:

determining an error function by making use of a blur function serving as a function representing the degree of blurring of a blurred input image and a geometrical-deformation matrix serving as a matrix for restricting an operation to lay out a 2-dimensional code shown by the input image on cells each serving as a configuration unit of the 2-dimensional code wherein the error function is a function satisfying a relation that, the smaller the error between the input image and an image obtained by adding geometrical deformations and blurs to a recovered image obtained from a recovering process, the more the approach to a result determined in advance;

determining pixel-value restriction information prescribing a restriction condition for a restriction imposed on a predetermined pixel value obtained from discretization of pixel values of the 2-dimensional code to be recovered;

determining an objective function on the basis of the error function and the pixel-value restriction information wherein the objective function is a function satisfying a relation that, the closer the recovered image to the true image, the more the approach to a result determined in advance; and determining a recovered image which optimizes the objective function.

* * * * *